United States Patent
Iwai et al.

(10) Patent No.: US 7,924,513 B2
(45) Date of Patent: Apr. 12, 2011

(54) LENS BARREL

(75) Inventors: Toshimitsu Iwai, Saitama (JP); Konoha Takeuchi, Tokyo (JP); Akira Kagaya, Saitama (JP); Takatoshi Ohzeki, Saitama (JP); Ken Tanaka, Tokyo (JP); Norihisa Kawamura, Tokyo (JP)

(73) Assignees: Sony Corporation, Tokyo (JP); Tamron Co., Ltd., Saitama (JP)

( * ) Notice: Subject to any disclaimer, the term of this patent is extended or adjusted under 35 U.S.C. 154(b) by 210 days.

(21) Appl. No.: 12/078,836

(22) Filed: Apr. 7, 2008

(65) Prior Publication Data

US 2009/0002826 A1 Jan. 1, 2009

(30) Foreign Application Priority Data

Apr. 10, 2007 (JP) ................................. 2007-102674

(51) Int. Cl.
*G02B 7/02* (2006.01)
(52) U.S. Cl. ....................................... 359/813; 359/557
(58) Field of Classification Search .................. 359/813, 359/814, 823, 824, 557; 396/55; 348/208.11
See application file for complete search history.

(56) References Cited

U.S. PATENT DOCUMENTS

| 5,680,251 | A | * | 10/1997 | Kato et al. | 359/557 |
| 7,308,195 | B2 | * | 12/2007 | Yumiki et al. | 396/75 |
| 2005/0129392 | A1 | | 6/2005 | Shinohara | |
| 2006/0034594 | A1 | | 2/2006 | Yumiki et al. | |

FOREIGN PATENT DOCUMENTS

| CN | 1501372 A | 6/2004 |
| JP | 2005-173160 | 6/2005 |

OTHER PUBLICATIONS

Chinese Office Action issued Sep. 25, 2009 for corresponding Chinese Application No. 200810089727.0.

* cited by examiner

*Primary Examiner* — Joseph Martinez
(74) *Attorney, Agent, or Firm* — Rader, Fishman & Grauer PLLC

(57) ABSTRACT

There is provided a lens barrel including: a rear barrel to which an imaging device is attachable, an imaging optical system leading a subject image to the imaging device, and an image blur correcting unit moving a shift lens forming the imaging optical system in a plane perpendicular to an optical axis of the imaging optical system. The image blur correcting unit includes a base supporting the shift lens in a plane perpendicular to the optical axis of the imaging optical system. The lens barrel includes a support mechanism supporting the base to be movable relative to the rear barrel along a plane perpendicular to the optical axis; and a fixing device fixing the base to the rear barrel.

14 Claims, 16 Drawing Sheets

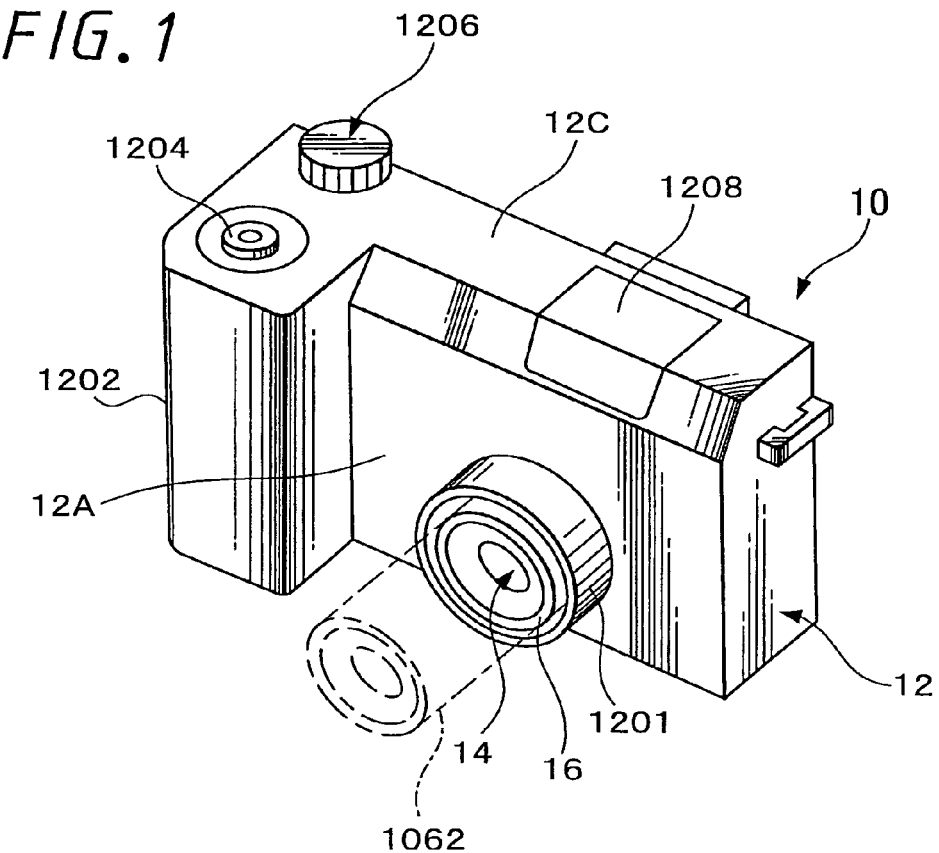
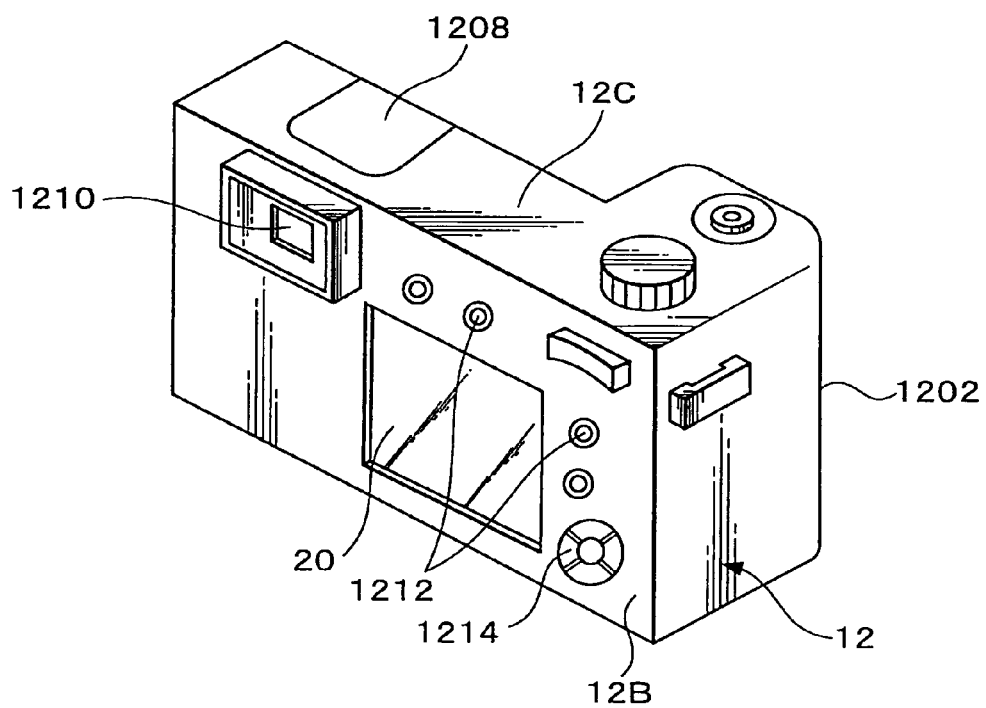

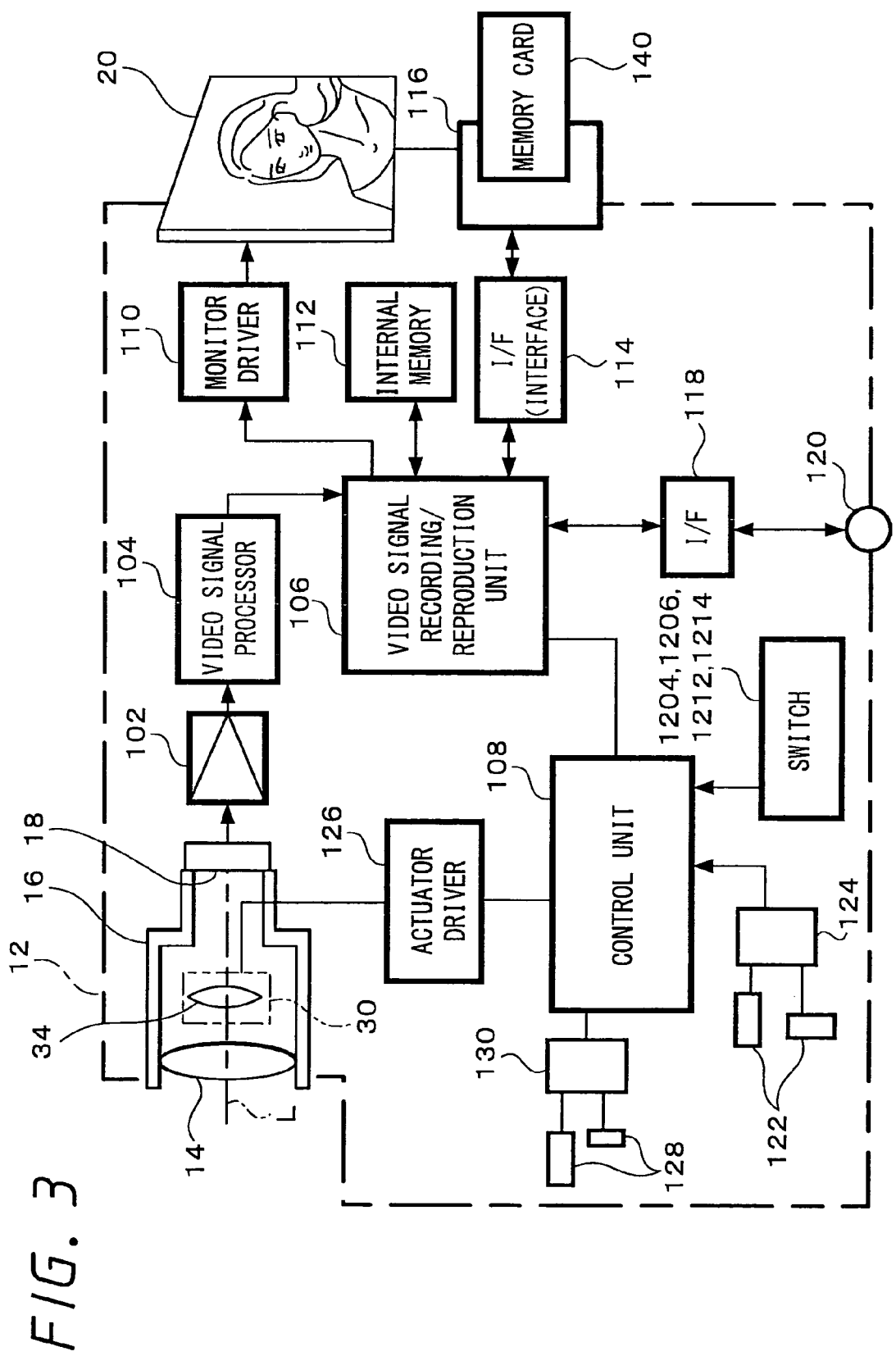

LENS BARREL

CROSS REFERENCES TO RELATED APPLICATIONS

The present invention contains subject matter related to Japanese Patent Application JP 2007-102674 filed in the Japanese Patent Office on Apr. 10, 2007, the entire contents of which being incorporated herein by reference.

BACKGROUND OF THE INVENTION

1. Field of the Invention

The invention relates to a lens barrel.

2. Description of the Related Art

In an imaging apparatus such as a digital still camera or digital video camera, a subject image guided by an imaging optical system incorporated in a lens barrel is formed on an imaging device to image the subject image.

When a hand holding the imaging apparatus accidentally moves and so-called "shake" occurs in imaging, a subject image formed on the imaging apparatus is blurred.

Japanese Unexamined Patent Application Publication No. 2005-173160 discloses an imaging apparatus including an image blur correcting unit supporting a lens holding frame holding a shift lens forming part of an imaging optical system to be movable along a plane perpendicular to an optical axis of the shift lens, and moving the lens holding frame using a driving mechanism to stabilize the subject image formed on an imaging device.

SUMMARY OF THE INVENTION

In the meantime, it is desired that an imaging apparatus having such an image blur correcting unit include an imaging optical system that has a higher zoom ratio and is further reduced in size.

Generally, when an imaging optical system is reduced in size in a direction of an optical axis and in a direction perpendicular to the optical axis, a lens group forming the imaging optical system tends to have a high refracting power, and a positional deviation of a central position (central axis) of a curvature of each lens from the optical axis of the imaging optical system greatly affects performance of the imaging optical system. Therefore, a resolution and a quantity of ambient light may be reduced even if a slight positional deviation occurs.

Accordingly, in order to reduce an imaging apparatus having an image blur correcting unit in size while ensuring optical performance, it may be necessary to suppress a positional deviation of an optical axis of a shift lens moved by the image blur correcting unit from an optical axis of an imaging optical system.

The present invention has been made in view of such circumstances and provides a lens barrel that may be advantageously reduced in size while ensuring optical performance.

According to an embodiment of the present invention, there is provided a lens barrel including a rear barrel to which an imaging device is attachable, an imaging optical system leading a subject image to the imaging device, and an image blur correcting unit moving a shift lens forming the imaging optical system in a plane perpendicular to an optical axis of the imaging optical system. The image blur correcting unit includes a base supporting the shift lens in a plane perpendicular to the optical axis of the imaging optical system. The lens barrel includes a support mechanism supporting the base to be movable relative to the rear barrel along a plane perpendicular to the optical axis; and a fixing device fixing the base to the rear barrel.

According to an embodiment of the present invention, there is provided a lens barrel including a barrel, an imaging optical system leading a subject image into the barrel, and an image blur correcting unit moving a shift lens forming the imaging optical system in a plane perpendicular to an optical axis of the imaging optical system. The barrel includes a rear barrel and a front barrel appearing from and disappearing into the rear barrel. The image blur correcting unit includes a base supporting the shift lens in a plane perpendicular to the optical axis of the imaging optical system. The lens barrel includes a support mechanism supporting the base to be movable relative to the rear barrel along a plane perpendicular to the optical axis, and a fixing device fixing the base to the rear barrel.

According to an embodiment of the present invention, it is possible to fix a base of an image blur correcting unit to a rear barrel after adjusting a shift lens, specifically, after allowing an optical axis of the shift lens to match with an optical axis of an imaging optical system.

Accordingly, an imaging optical system may advantageously have optical performance ensured and a lens barrel and an imaging apparatus may advantageously be reduced in size.

BRIEF DESCRIPTION OF THE DRAWINGS

FIG. 1 is a front perspective view of an imaging apparatus 10.

FIG. 2 is a rear perspective view of an imaging apparatus 10.

FIG. 3 is a block diagram showing a control system of an imaging apparatus 10.

DESCRIPTION OF THE PREFERRED EMBODIMENTS

Figure 4:
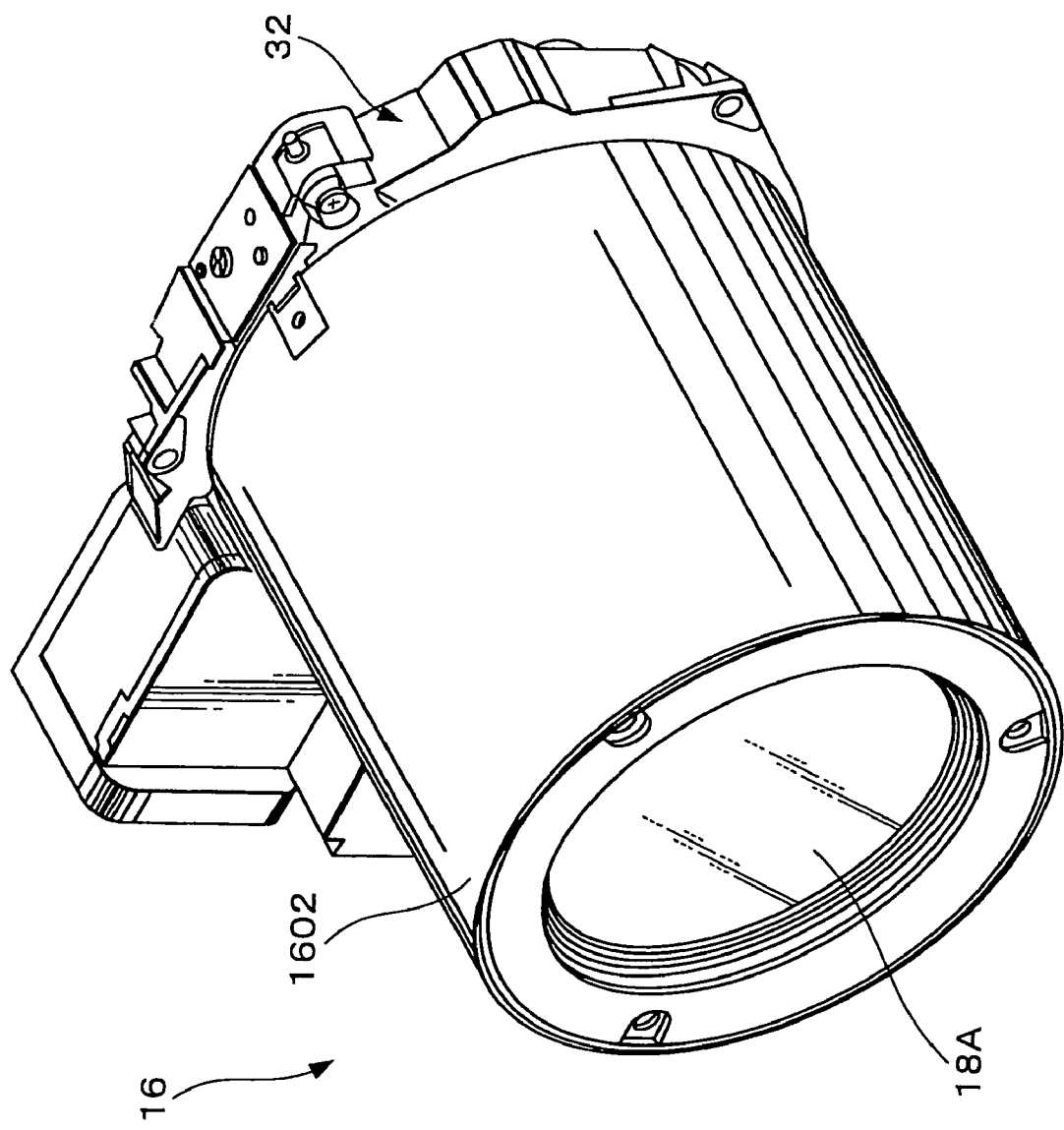
FIG. 4 is a perspective view of a lens barrel 16 in a housed position.

Next, an embodiment of the present invention will be described.

FIG. 1 is a front perspective view of an imaging apparatus 10 having a lens barrel 16 according to the present embodiment mounted. FIG. 2 is a rear perspective view of the imaging apparatus 10.

As shown in FIGS. 1 and 2, the imaging apparatus 10 is a digital still camera and has an enclosure 12 forming a jacket.

In the present specification, the term "front" refers a subject image side and the term "rear" refers to an image forming side. The terms "left" and "right" in the imaging apparatus 10 refer to "left" and "right" viewed from front to rear.

The enclosure 12 has a front surface 12A facing forward, a rear surface 12B facing rearward, an upper surface 12C facing upward, a lower surface facing downward and left and right side surfaces facing leftward and rightward.

A barrel 1201 having a shape of a longitudinally extending cylindrical wall is provided in a place close to a right side on the front surface 12A of the enclosure 12. A collapsible lens barrel 16 is provided in the barrel 1201 to house and hold an imaging optical system 14.

An imaging device 18 (FIG. 3) is provided on a rear edge of the lens barrel 16 to image a subject image guided by the imaging optical system 14.

A later-described image blur correcting unit 30 (FIG. 3) is incorporated in the lens barrel 16.

The image blur correcting unit 30 includes a shift lens 34 (FIG. 3) forming part of the imaging optical system 14.

A grip 1202 protrudes forward on a left side of the front surface 12A.

A shutter button 1204 and an operation ring 1206 operated by right hand fingers holding the grip 1202 are provided on an upper surface of the grip 1202.

The operation ring 1206 is rotationally operated to adjust a set value of a shutter speed or aperture, for example.

A flash unit 1208 is provided which may appear and disappear on the upper surface 12C to irradiate with imaging auxiliary light.

There is provided, on the bottom surface, a memory card slot 116 (FIG. 3) for insertion and detachment of a memory card 140 (FIG. 3) that is a recording medium to record image data imaged by the imaging apparatus 10.

A viewfinder 1210 is provided in an upper part of the rear surface 12B to view a subject image imaged by the imaging device 18.

There is provided, on the rear surface 12B, a display panel 20 formed by a monitor such as a liquid display to display a subject image imaged by the imaging device 18 or an image read from the memory card 140.

A plurality of operation buttons 1212 and a cross key 1214 are provided in places around the display panel 20 on the rear surface 12B to perform on/off operations of a power supply, operations related to imaging and reproduction or operations related to various settings.

FIG. 3 is a block diagram showing a control system of the imaging apparatus 10.

As shown in FIG. 3, the imaging apparatus 10 has a image signal amplifying unit 102, a image signal processor 104, a image signal recording/reproduction unit 106, a control unit 108, a monitor driver 110, an internal memory 112, a memory card interface 114, the memory card slot 116, an external input/output interface 118, an external input/output terminal 120, a shake detector 122, a shake signal processor 124, an actuator driver 126, a position detector 128 and a position detection signal processor 130.

An imaging signal generated by the imaging device 18 is amplified by the image signal amplifying unit 102, subjected to predetermined signal processing by the image signal processor 104 and supplied to the image signal recording/reproduction unit 106 as a image signal.

The image signal recording/reproduction unit 106 records the image signal supplied from the image signal processor 104 in the memory card 140 as a recording medium mounted on the memory card slot 116 through the memory card interface 114 in accordance with control from the control unit 108.

The image signal recording/reproduction unit 106 supplies the image signal supplied from the image signal processor 104 or the image signal supplied from the memory card 140 through the memory card interface 114 to the display panel 20 through the monitor driver 110 to display an image.

The control unit 108 controls various parts including the image signal recording/reproduction unit 106 based on operations of the shutter button 1204, the operation ring 1206, the operation buttons 1212 and the cross key 1214.

The internal memory 112 provides a memory area necessary for operation of the image signal recording/reproduction unit 106.

The external input/output interface 118 exchanges a image signal between external electronic equipment connected to the external input/output terminal 120 and the image signal recording/reproduction unit 106.

The shake detector 122 detects shake based on an acceleration applied to the imaging apparatus 10 or vibration and outputs a shake detection signal according to a degree of shake.

Various known sensors such as a gyro sensor may be used as the shake detector 122.

The shake signal processor 124 generates a shake detection signal as a digital signal indicating a direction or degree of shake from the shake detection signal as an analog signal supplied from the shake detector 122 and supplies the generated signal to the control unit 108.

The position detector 128 detects a position of a second movable body 50 (FIG. 7) holding the shift lens 34 in first and second directions perpendicular to each other on a plane perpendicular to an optical axis L of the imaging optical system 14 (vertical and transverse directions with the optical axis L of the imaging optical system 14 of the imaging apparatus 10 directed in a horizontal direction) and outputs a position detection signal according to the position of the second movable body 50.

As the position detector 128, various known sensors may be used such as a sensor having a magnet and a hole element placed opposite to the magnet and using a detection signal obtained from the hole element in accordance with a change in relative positions of the magnet and the hole element.

The position detection signal processor 130 generates a position detection signal as a digital signal indicating a position from the position detection signal as an analog signal supplied from the position detector 128 and supplies the generated signal to the control unit 108.

The control unit 108 controls the actuator driver 126 based on the shake detection signal supplied from the shake signal processor 124.

Accordingly, in the present embodiment, the shake detector 122 and the control unit 108 form a detector detecting image blur and calculating a quantity of movement of the shift lens 34 for which the image blur should be corrected.

The actuator driver 126 generates a driving signal based on the quantity of movement calculated in the detector and supplies the driving signal to a later-described actuator 86 (FIG. 12) to drive the actuator 86.

In the present embodiment, the control unit 108 performs feedback control based on the position detection signal supplied from the position detection signal processor 130 when generating a shake correction signal to control with high accuracy the position of the second movable body 50 holding the shift lens 34.

Next, a configuration of the lens barrel 16 of the present embodiment will be described.

Figure 5:
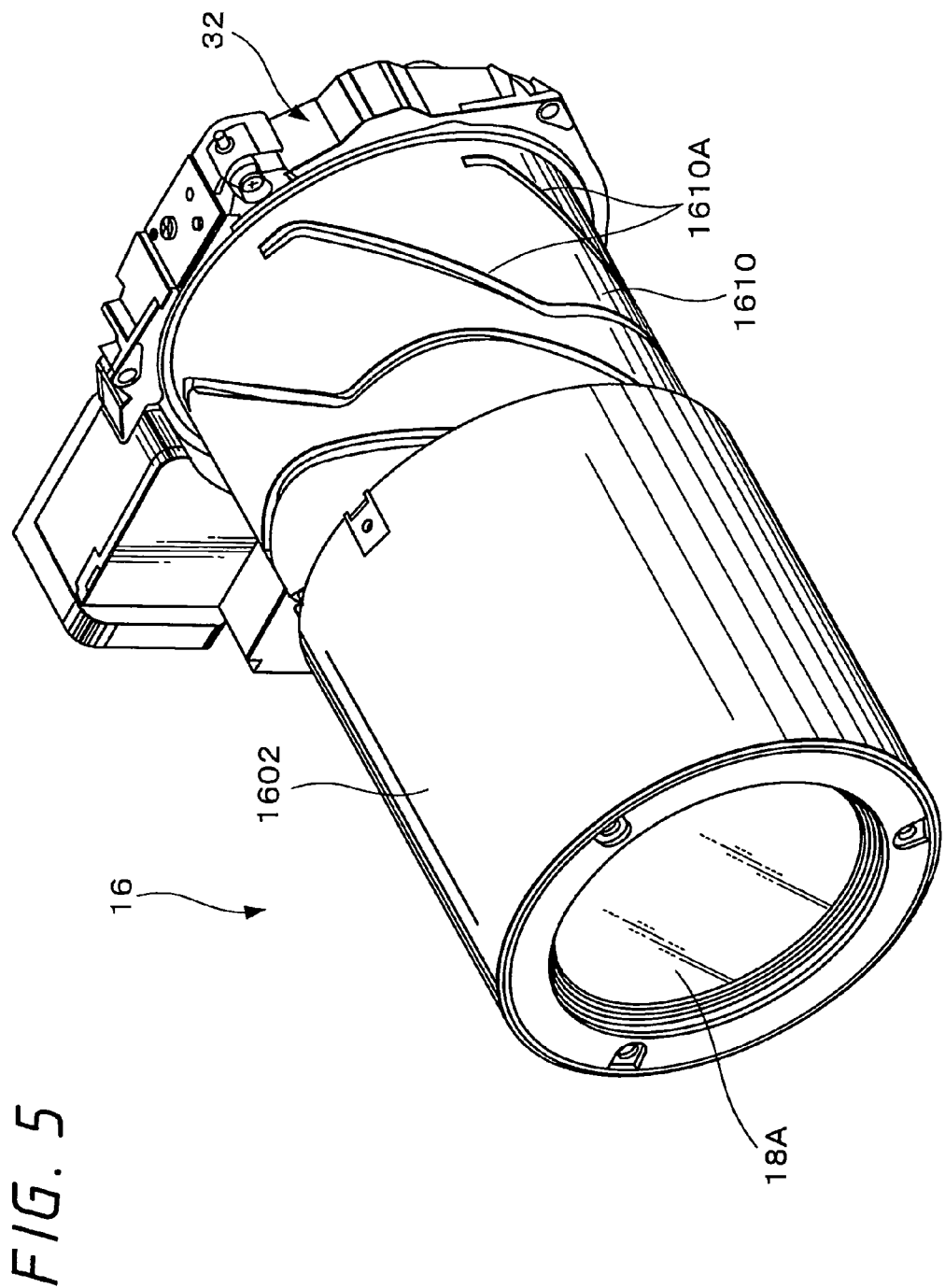
FIG. 5 is a perspective view of a lens barrel 16 in a protruding position.
Figure 6:
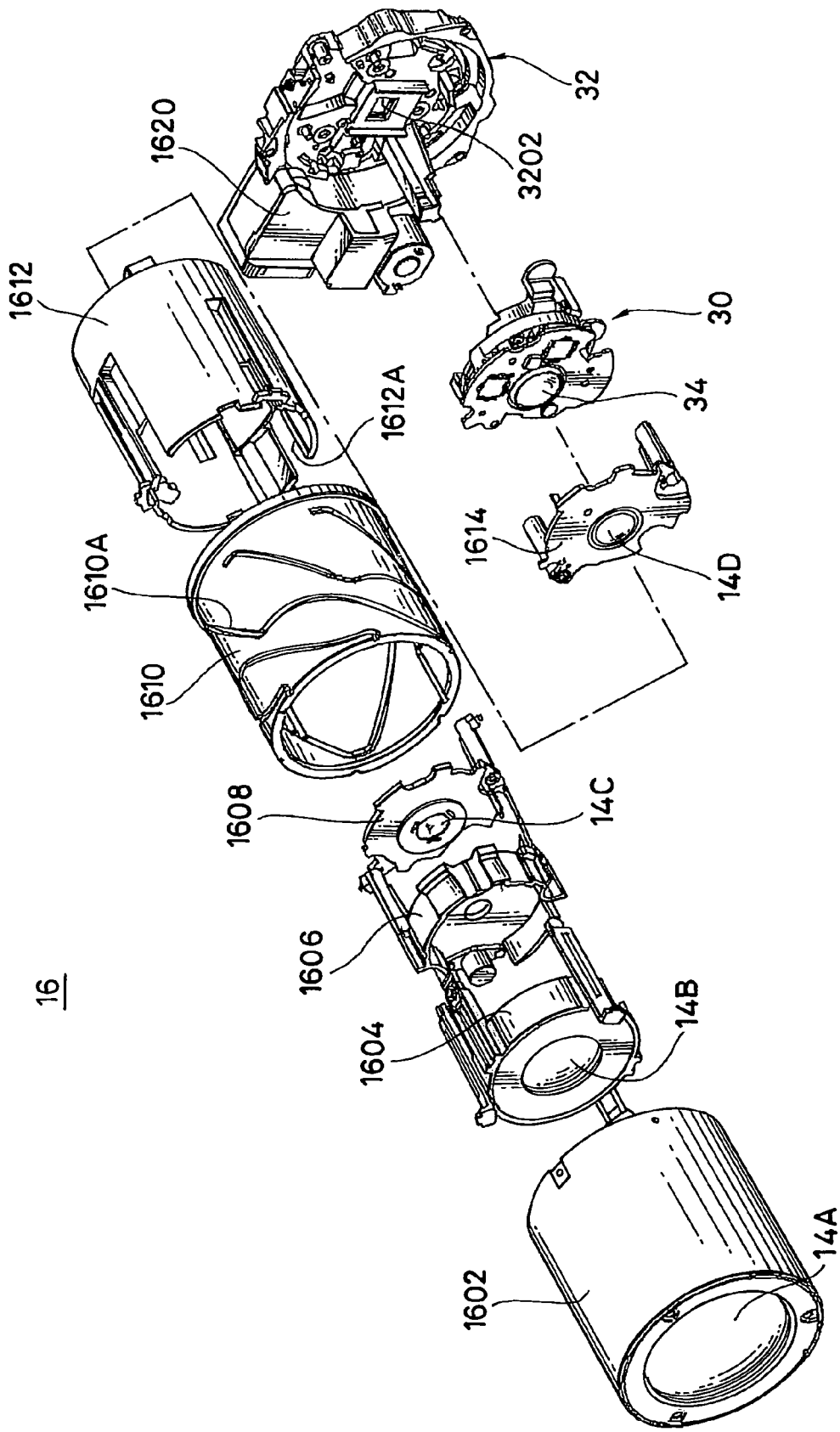
FIG. 6 is an exploded perspective view showing a configuration of a lens barrel 16 according to an embodiment of the present invention.

FIG. 4 is a perspective view of the lens barrel 16 in a housed position. FIG. 5 is a perspective view of the lens barrel 16 in a protruding position. FIG. 6 is an exploded perspective view showing a configuration of the lens barrel 16.

As shown in FIG. 6, the lens barrel 16 includes a first group lens frame 1602 (front barrel), a second group lens frame 1604, an iris 1606, a third group lens frame 1608, a cam ring 1610, a rectilinear propagation guide ring 1612, a focus lens holding frame 1614, the image blur correcting unit 30 and a rear barrel 32.

The first group lens frame 1602 is cylindrical and holds a first group lens 14A on its front edge.

The cam ring 1610 is incorporated in the first group lens frame 1602.

The cam ring 1610 has a cylindrical wall on which a plurality of cam grooves 1610A are formed, has a rear edge rotatably supported by the rear barrel 32, and is reciprocally rotatably driven by a driving mechanism 1620 assembled with the rear barrel 32.

The rectilinear propagation guide ring 1612 is incorporated in the cam ring 1610.

The rectilinear propagation guide ring 1612 has a cylindrical wall on which a plurality of cam rings 1612A are formed and has a rear edge attached to the rear barrel 32.

The second group lens frame 1604 is housed in the cam ring 1610 and holds a second group lens 14B.

The iris 1606 is housed in the cam ring 1610 behind the second group lens frame 1604 and adjusts a quantity of light guided by the imaging optical system 14 or forms a mechanical shutter.

The third group lens frame 1608 is housed in the cam ring 1610 behind the iris 1606 and holds a third group lens 14C.

Cam pins provided in the first group lens frame 1602, the second group lens frame 1604, the iris 1606 and the third group lens frame 1608, respectively, are engaged with the corresponding cam grooves 1610A and 1612A, respectively. The first group lens frame 1602, the second group lens frame 1604, the iris 1606 and the third group lens frame 1608 are linearly moved along the optical axis of the imaging optical system 14 by rotation of the cam ring 1610.

The focus lens holding frame 1614 is housed in the rectilinear propagation guide ring 1612 behind the third group lens frame 1608 and holds a focus lens 14D.

The focus lens holding frame 1614 is connected to the focus lens 14D to be movable along the optical axis of the imaging optical system 14 through a guide shaft (not shown) protruding from a front surface of the rear barrel 32, and is moved along the optical axis by a feed mechanism (not shown).

Figure 7:
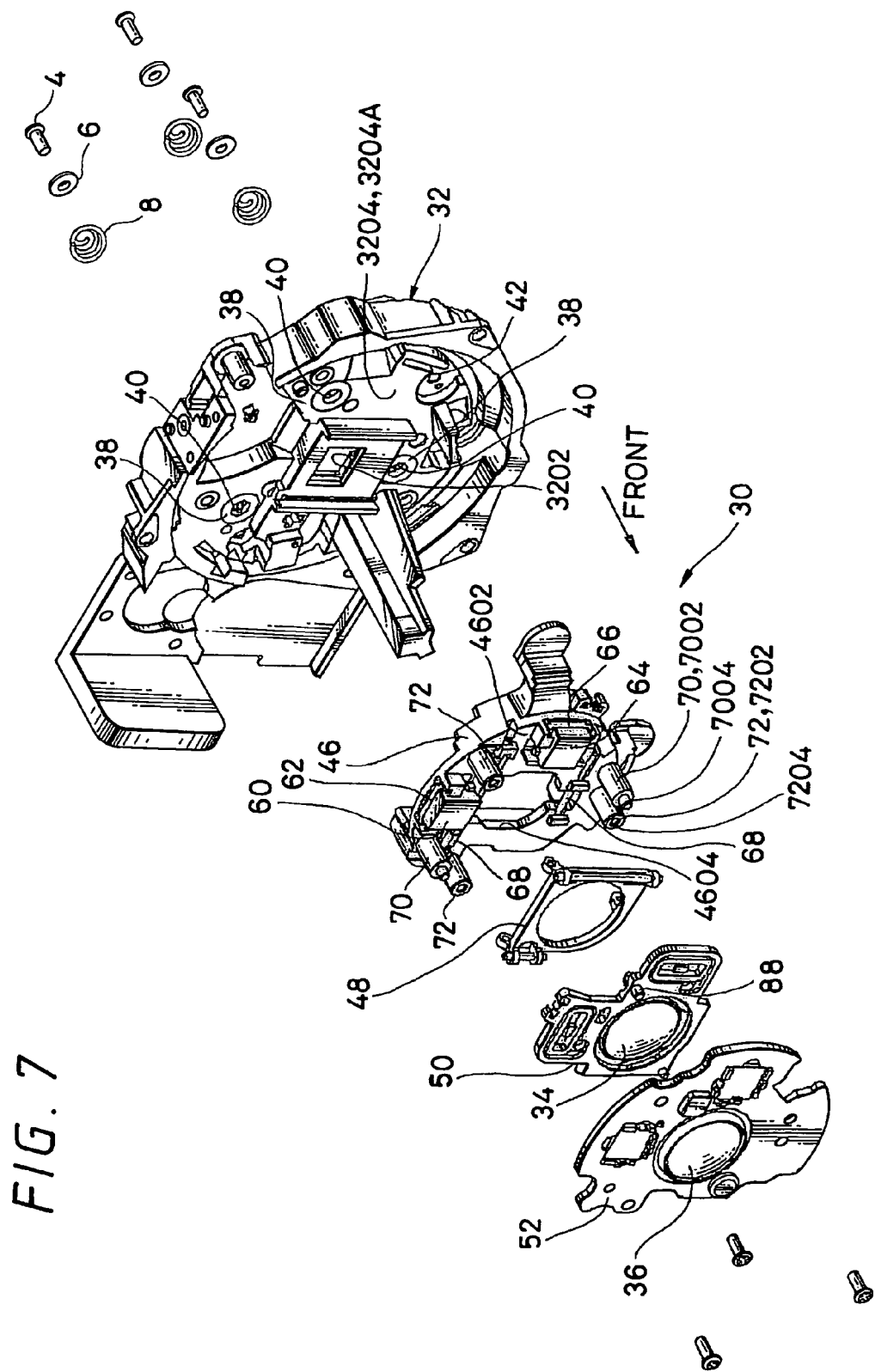
FIG. 7 is an exploded perspective view of an image blur correcting unit 30 and a rear barrel 32.

The image blur correcting unit 30 is housed in the rectilinear propagation guide ring 1612 behind the focus lens holding frame 1614, is attached to the rear barrel 32, and has the shift lens 34 and a fixed lens 36 (FIG. 7).

The rear barrel 32 is plate-like and is placed in a rearmost part of the lens barrel 16.

A rectangular opening 3202 is formed in a center of the rear barrel 32. The imaging device 18 (FIG. 3) is attached to a rear surface of the rear barrel 32 with an imaging surface of the imaging device 18 facing the image blur correcting unit 30 through the opening 3202.

In the present embodiment, the first group lens 18A, the second group lens 18B, the third group lens 18C, the shift lens 34 and the fixed lens 36 form the imaging optical system 14.

An operation of the lens barrel 16 will be described.

The lens barrel 16 is configured as follows. The cam ring 1610 is rotated by the driving mechanism 1620 to move the first group lens frame 1602, the second group lens frame 1604, the iris 1606 and the third group lens frame 1608 along the optical axis through the cam grooves 1610A and 1612A. Accordingly, the lens barrel 16 is moved between a housed position (FIG. 4) in which the first group lens frame 1602 is immersed in the barrel 1201 as indicated by a continuous line in FIG. 1 and a protruding position (FIG. 5) in which the first group lens frame 1602 protrudes from the barrel 1201 as indicated by a two-dot chain line in FIG. 1.

The first group lens frame 1602, the second group lens frame 1604 and the third group lens frame 1608 are moved along the optical axis between the housed position and the protruding position according to a quantity of rotation of the cam ring 1610. Accordingly, positions of the first group lens 14A, the second group lens 14B and the third group lens 14C along the optical axis are changed to perform a zoom operation.

The focus lens holding frame 1614 is moved along the optical axis by the feeding mechanism, so that a position of the focus lens 14D along the optical axis is changed to perform a focusing operation.

Next, the rear barrel 32 and the image blur correcting unit 30 will be described.

Figure 8:
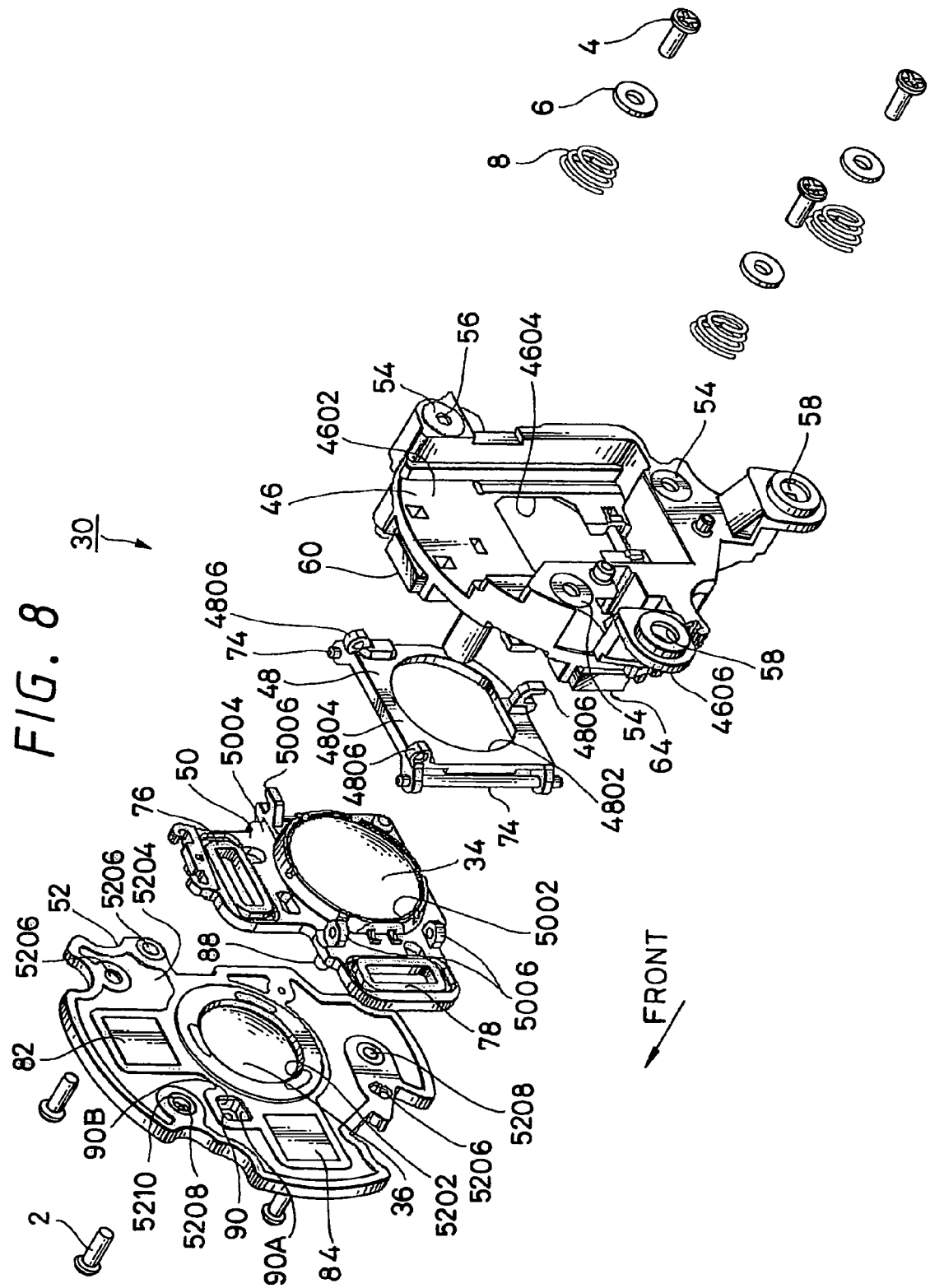
FIG. 8 is an exploded perspective view of an image blur correcting unit 30.

FIG. 7 is an exploded perspective view of the image blur correcting unit 30 and the rear barrel 32. FIG. 8 is an exploded perspective view of the image blur correcting unit 30.

Figure 9:
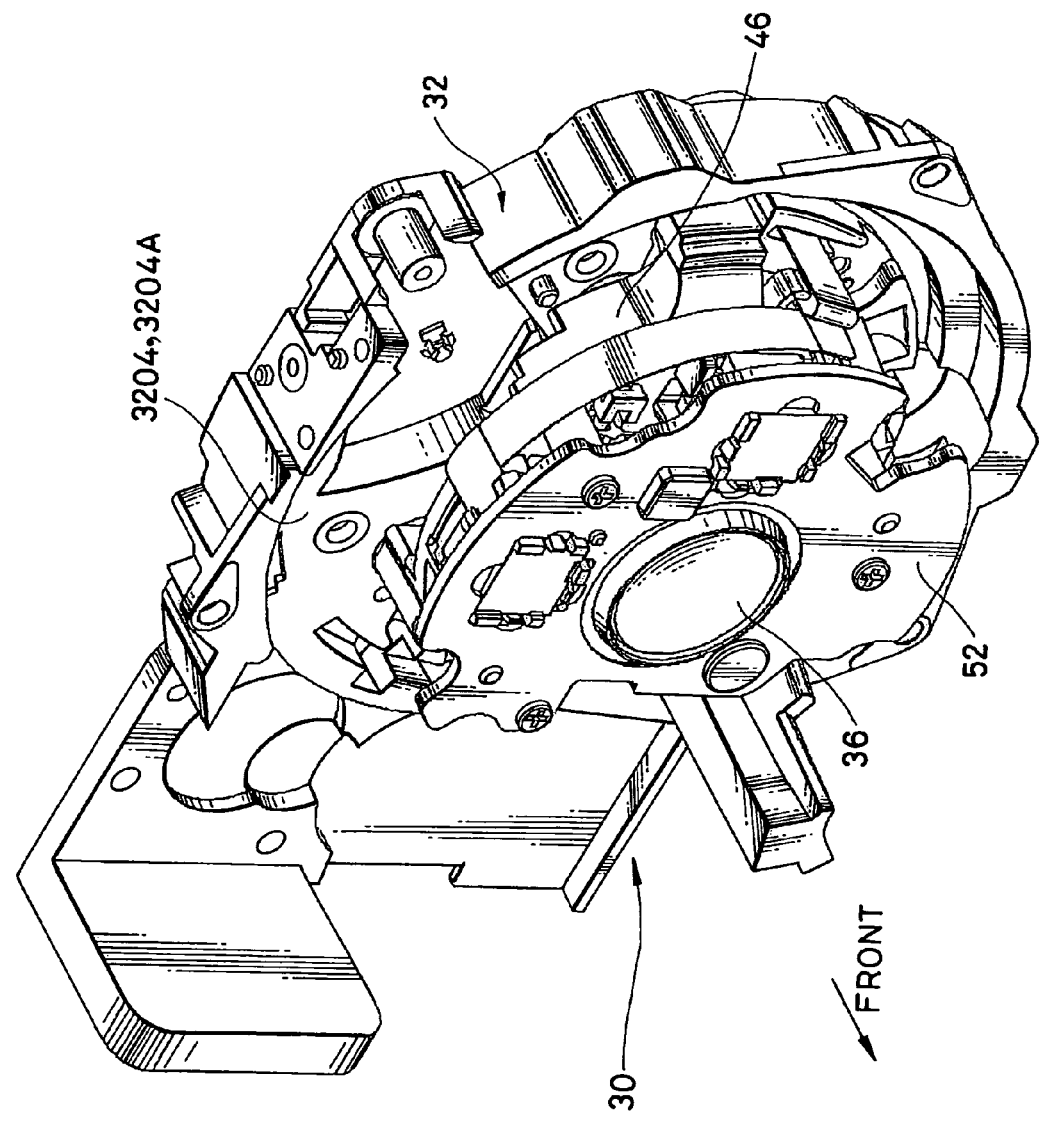
FIG. 9 is a perspective view of a state where an image blur correcting unit 30 is attached to a rear barrel 32.
Figure 10:
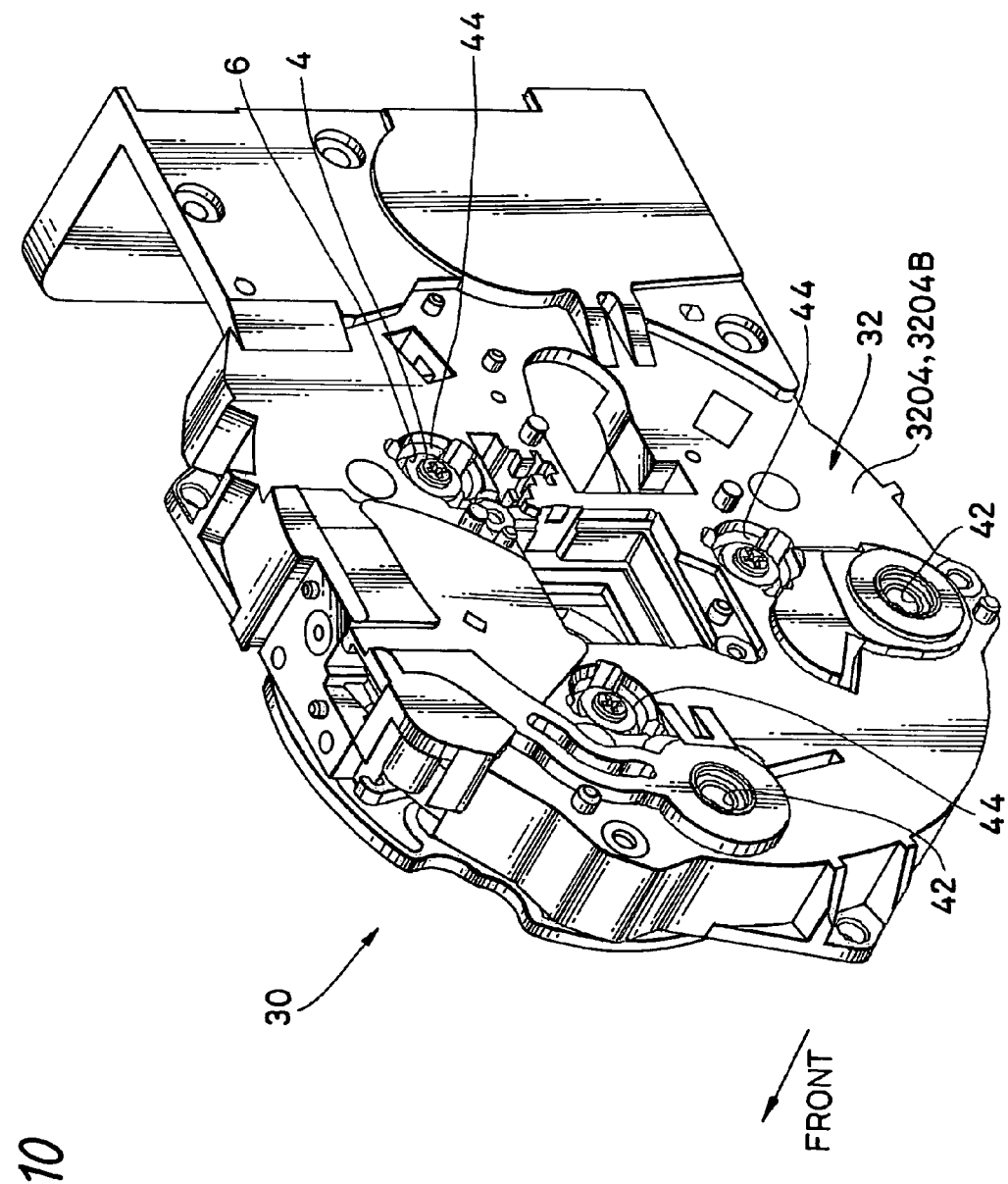
FIG. 10 is a perspective view of a state where an image blur correcting unit 30 is attached to a rear barrel 32.

FIGS. 9 and 10 are perspective views of a state where the image blur correcting unit 30 is attached to the rear barrel 32.

Figure 11:
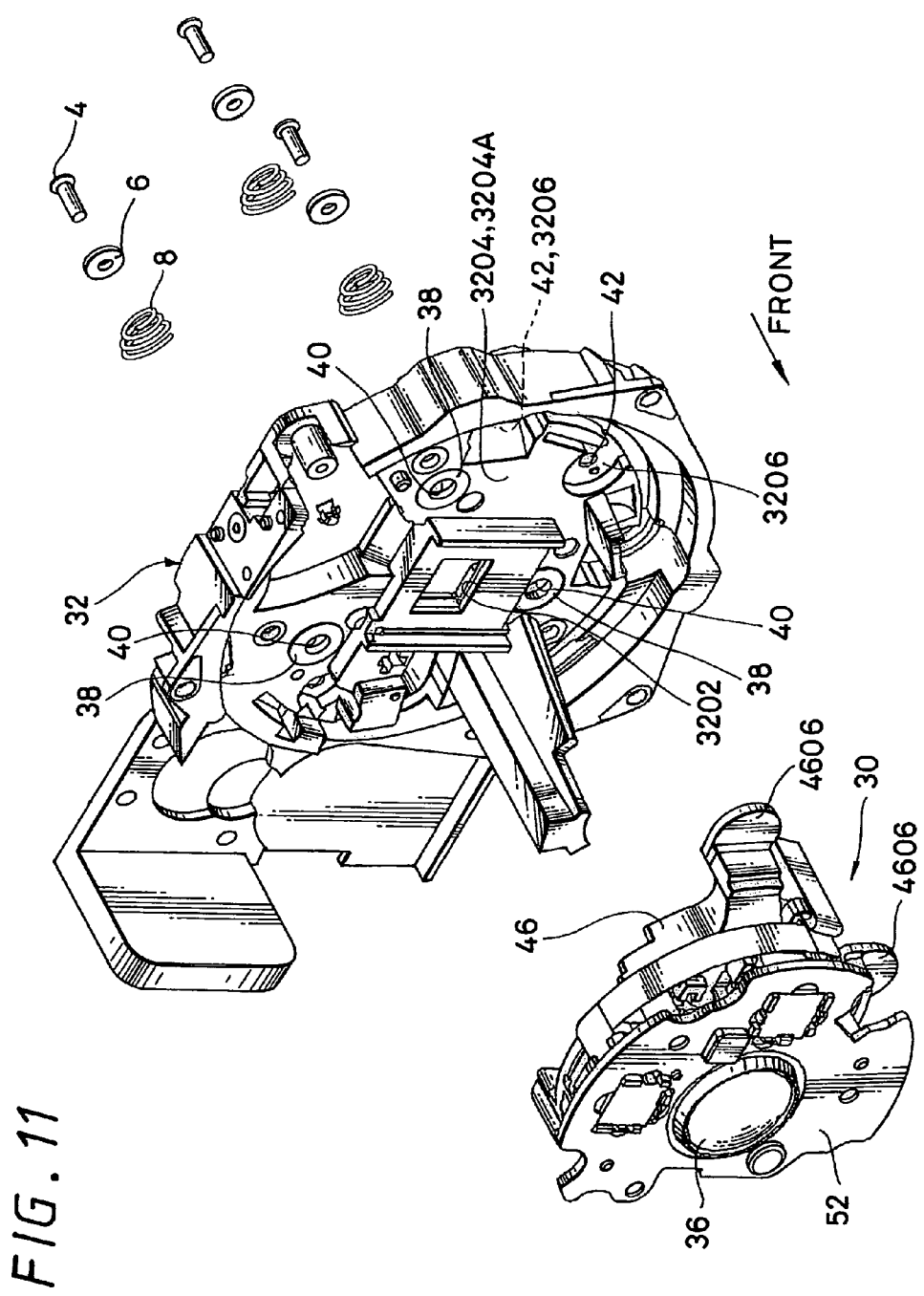
FIG. 11 is a view describing attachment of an image blur correcting unit 30 to a rear barrel 32.

FIG. 11 is a view describing attachment of the image blur correcting unit 30 to the rear barrel 32.

Figure 12:
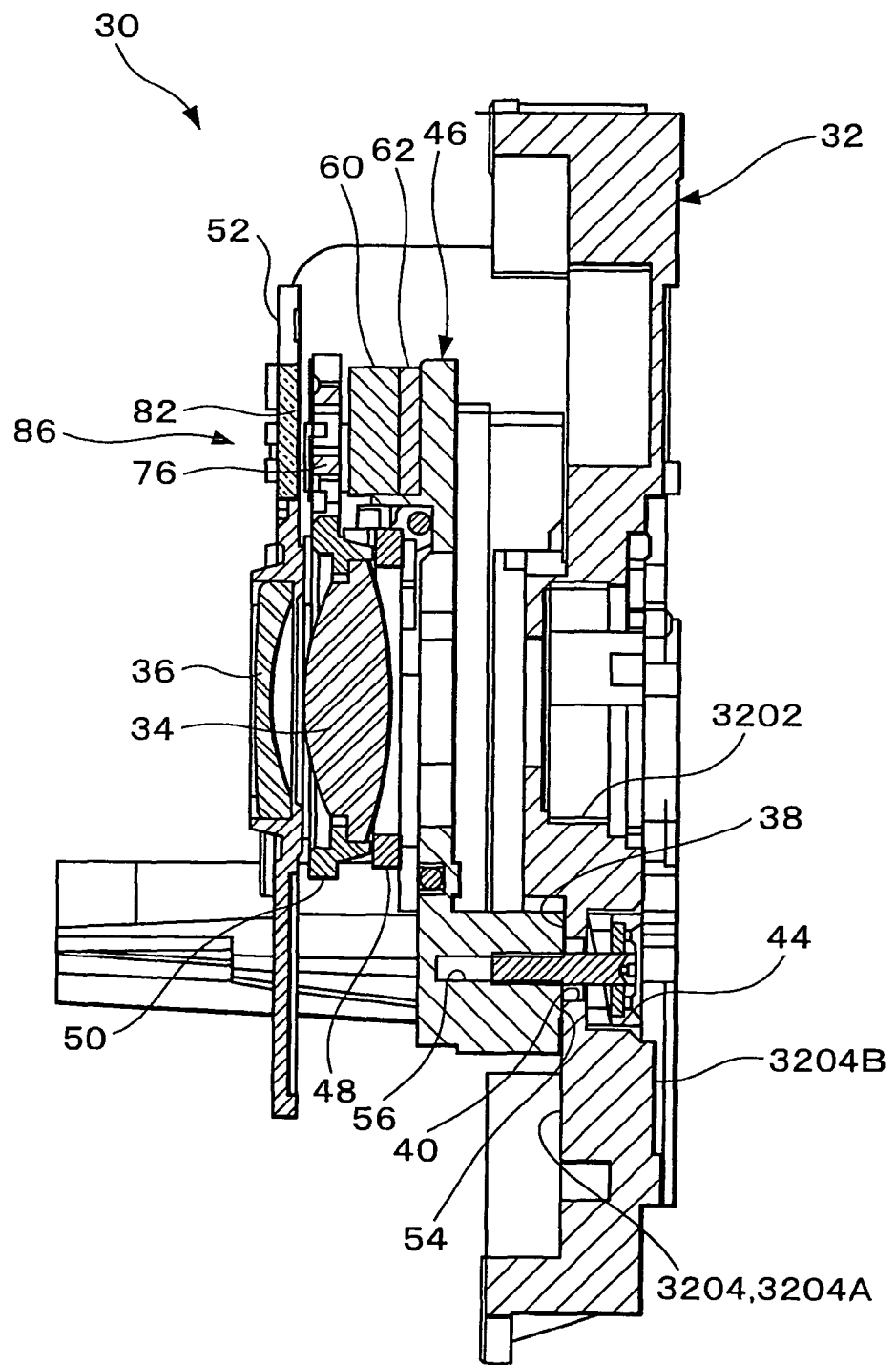
FIG. 12 is a cross-sectional view of a state where an image blur correcting unit 30 is attached to a rear barrel 32.

FIG. 12 is a cross-sectional view of a state where the image blur correcting unit 30 is attached to the rear barrel 32.

Figure 13:
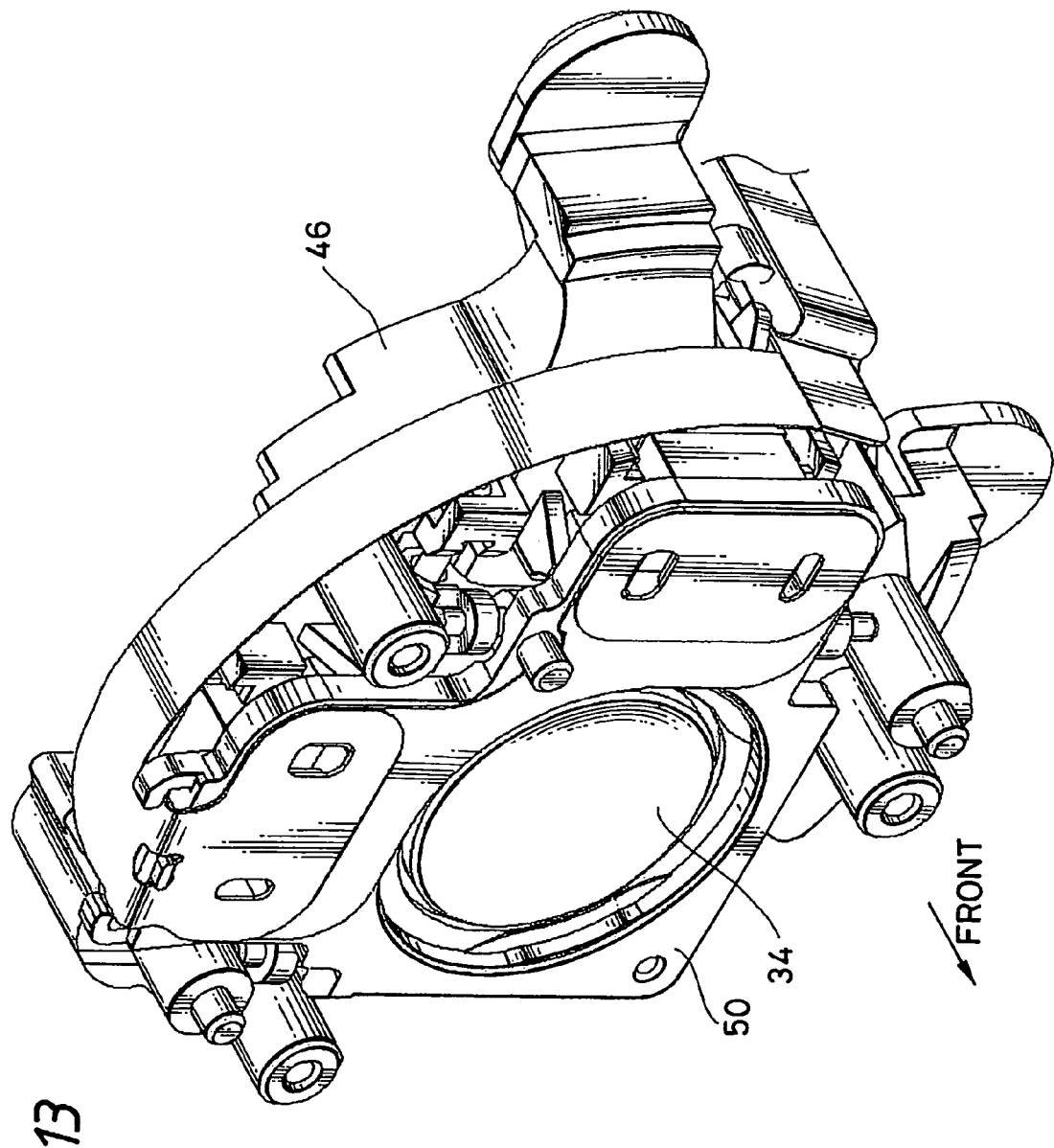
FIG. 13 is a perspective view showing a state where first and second movable bodies 48 and 50 are attached to a base 46.

FIG. 13 is a perspective view showing a state where first and second movable bodies 48 and 50 are attached to a base 46.

Figure 14:
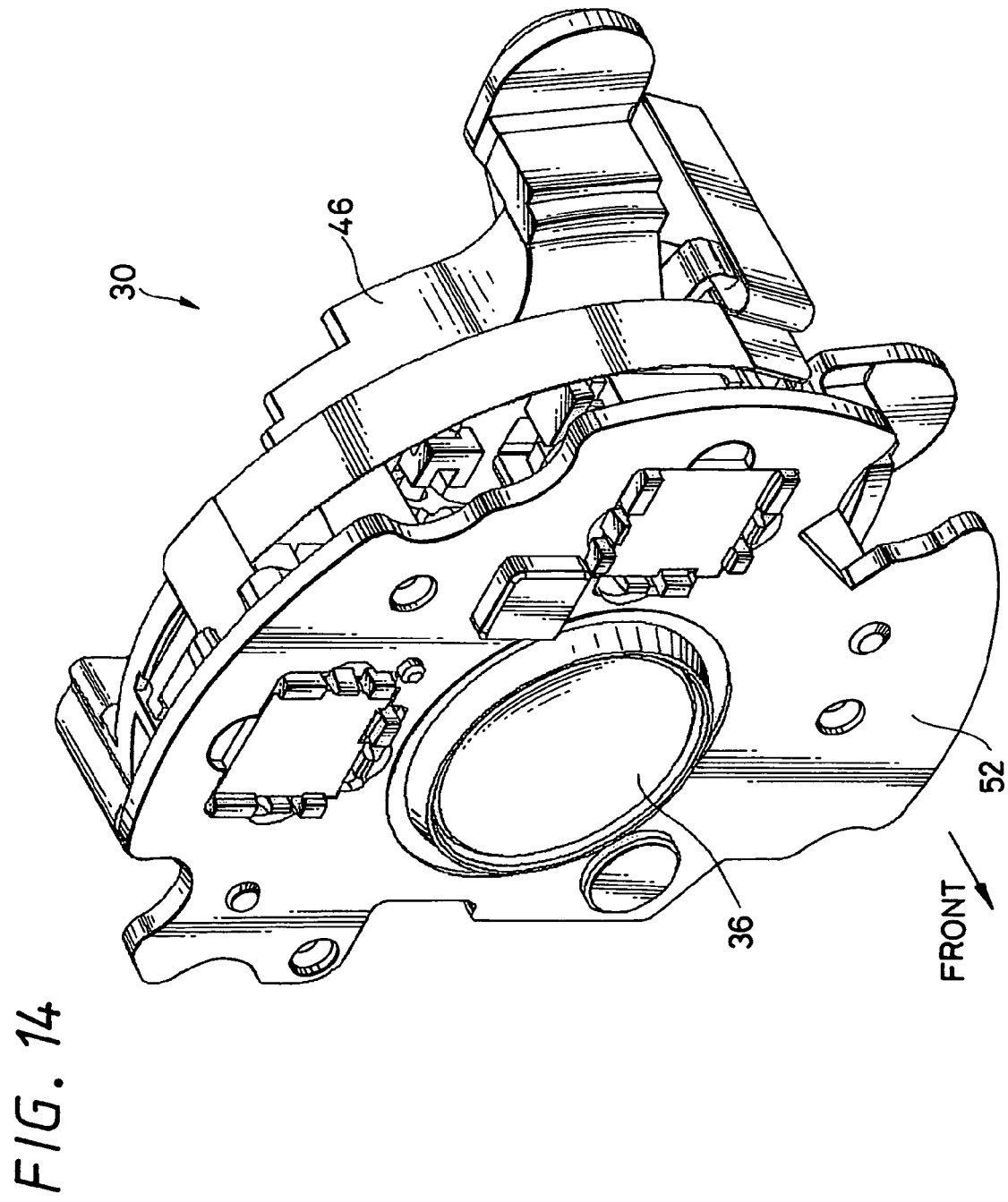
FIG. 14 is a perspective view showing a state where first and second movable bodies 48 and 50 and a fixed lens holding frame 52 are attached to a base 46.
Figure 15:
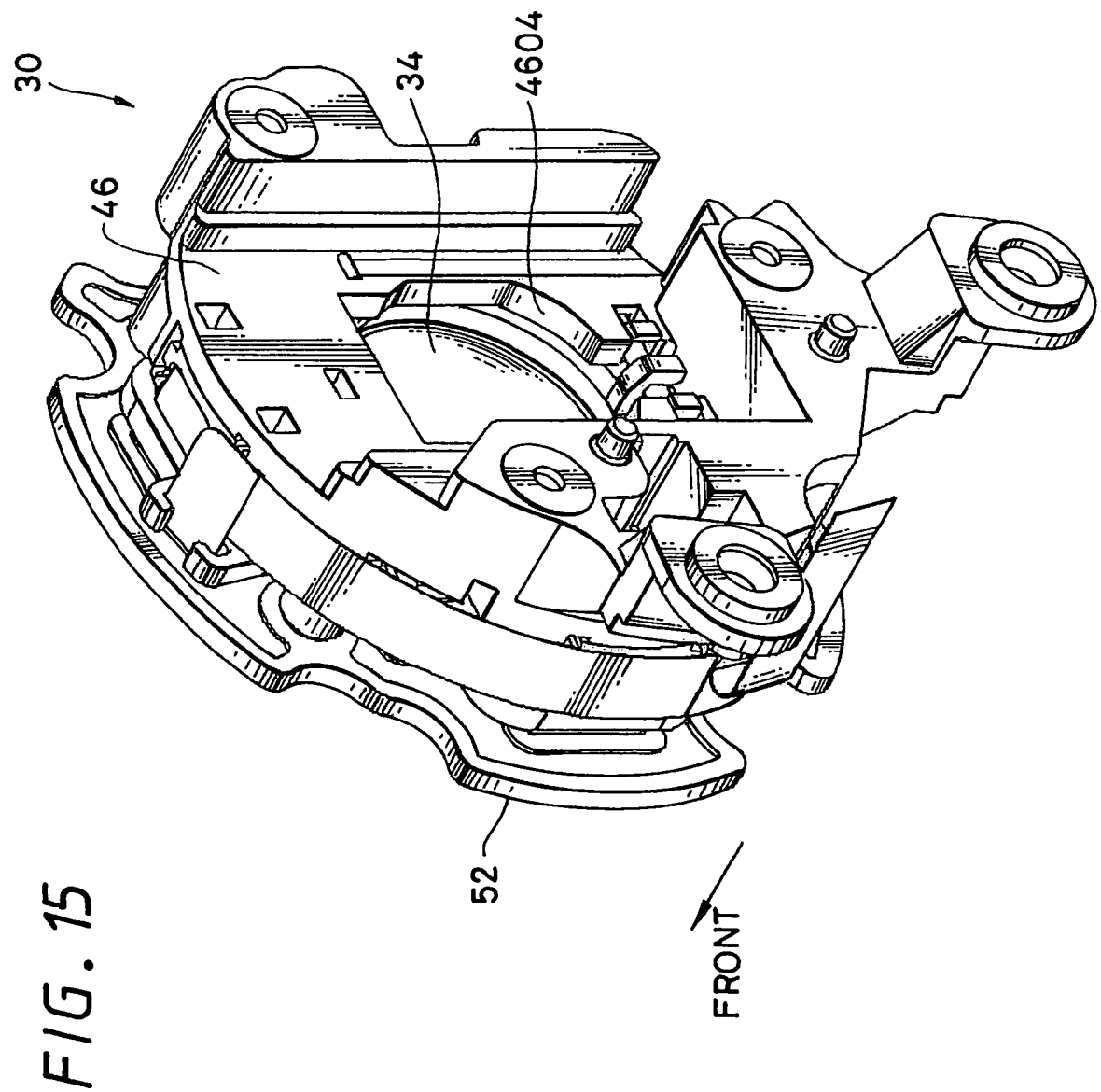
FIG. 15 is a perspective view showing a state where first and second movable bodies 48 and 50 and a fixed lens holding frame 52 are attached to a base 46.

FIGS. 14 and 15 are perspective views showing a state where the first and second movable bodies 48 and 50 and a fixed lens holding frame 52 are attached to the base 46.

Figure 16:
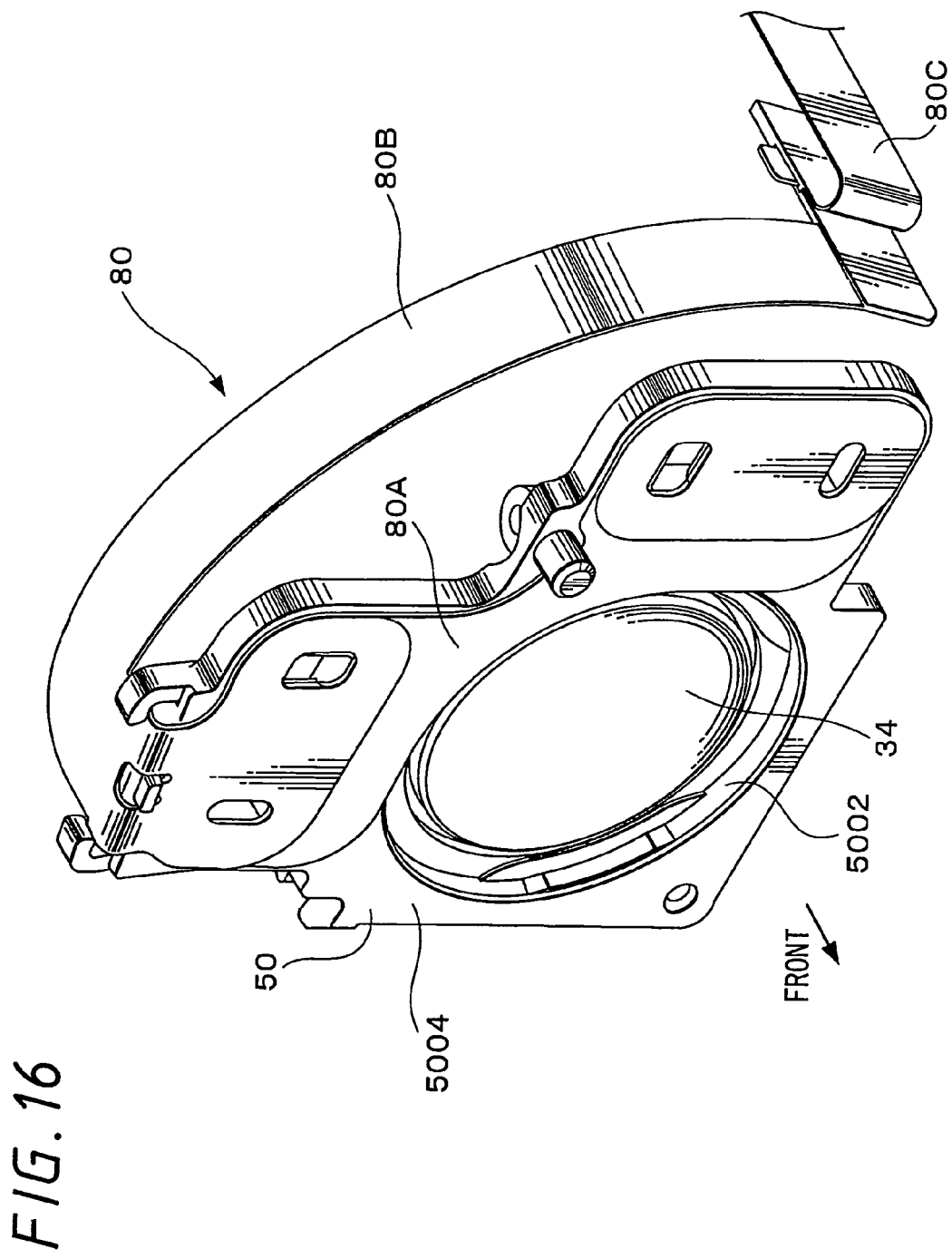
FIG. 16 is a view describing attachment of a flexible printed circuit board 80.
Figure 17:
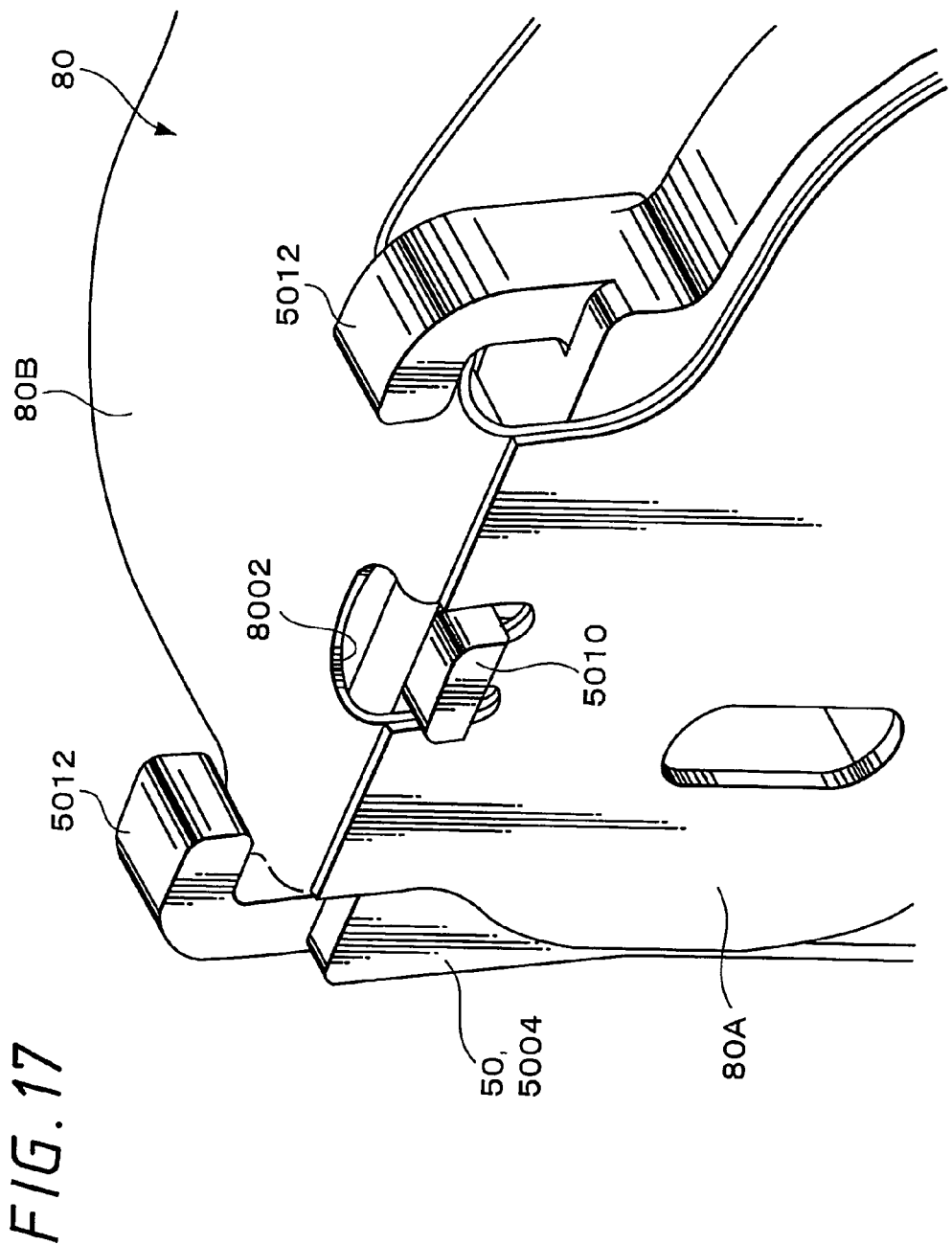
FIG. 17 is a main part enlarged view of FIG. 16.

FIG. 16 is a view describing attachment of a flexible printed circuit board 80. FIG. 17 is a main part enlarged view of FIG. 16.

As shown in FIGS. 7 and 11, the rear barrel 32 has a main body plate 3204 extending on a plane perpendicular to the optical axis of the imaging optical system 14, and the opening 3202 is formed in a center of the main body plate 3204.

Three first abutting surfaces 38 are provided with almost equal intervals between them on a circumference having a center of the imaging surface of the imaging device 18 as a center in places around the opening 3202 and on a front surface 3204A of the main body plate 3204 facing forward.

The three first abutting surfaces 38 extend on an identical plane perpendicular to the optical axis of the imaging optical system 14.

As shown in FIGS. 11 and 12, screw insertion holes 40 penetrating the main body plate 3204 in a thickness direction are formed in centers of the first abutting surfaces 38, respectively.

As shown in FIGS. 10 and 11, two jig insertion holes 42 are formed in the main body plate 3204 to penetrate the main body plate 3204 in the thickness direction with an interval between them in a circumferential direction on a circumference having a radius larger than that of a circumference connecting outer peripheries of the three first abutting surfaces 38 to each other.

In the present embodiment, as shown in FIG. 11, the jig insertion holes 42 are formed on bottom walls of rearward recesses 3206 provided on the front surface 3204A of the main body plate 3204 to penetrate the main body plate 3204.

As shown in FIGS. 10 and 12, recesses 44 each having a radius coaxial with and larger than that of each of the screw insertion holes 40 are formed in places with the screw insertion holes 40 opening on a rear surface 3204B of the main body plate 3204 facing rearward.

The screw insertion holes 40 are each formed having an inner diameter larger than a bore diameter of each of later-described screw holes 56 of the base 46 in order to ensure a clearance between the screw insertion hole 40 and an outer periphery of each of screws 4 (FIG. 8) screwed into the screw holes 56.

As shown in FIGS. 7 and 8, the image blur correcting unit 30 includes the base 46, the first movable body 48, the second movable body 50, the shift lens 34, the fixed lens holding frame 52 and the fixed lens 36.

As shown in FIG. 8, the base 46 has a main body plate 4602 extending on a plane perpendicular to the optical axis of the imaging optical system 14, and an opening 4604 is formed in a center of the main body plate 4602 to ensure an optical path for the imaging optical system 14.

Three second abutting surfaces 54 are formed around the opening 4604 on a rear surface of the base 46 facing rearward.

The three second abutting surfaces 54 extend on an identical plane perpendicular to the optical axis of the imaging optical system 14 and may be brought into contact with the first abutting surfaces 38.

As shown in FIGS. 8 and 12, the screw holes 56 extending in the main body plate 4602 in a thickness direction are formed in centers of the second abutting surfaces 54, respectively. The screw holes 56 are formed in places corresponding to the screw insertion holes 40 of the base 46.

As shown in FIG. 11, flanges 4606 are provided to be inserted into the recesses 3206 of the rear barrel 32 in places corresponding to the recesses 3206 on the rear surface of the base 46 facing rearward. As shown in FIG. 8, jig engaging recesses 58 are formed in places corresponding to the jig insertion holes 42 (FIG. 11) on rear surfaces of the flanges 4606 facing rearward.

As shown in FIG. 7, a magnet 60 and a yoke 62 are provided to be movable in a vertical direction in an upper part of a front surface of the base 46 facing forward, and a magnet 64 and a yoke 66 are provided to be movable in a transverse direction perpendicular to the vertical direction in a right side part of the front surface of the base 46 facing forward.

Transversely extending guide shafts 68 are attachably and detachably provided above and below the opening 4604 on the front surface of the base 46 facing forward.

Two positioning pins 70 and three bosses 72 are protrudingly provided with intervals in a circumferential direction, respectively, in places around the opening 4604 on the front surface of the base 46 facing forward.

The positioning pins 70 each have a base unit 7002 and a small diameter unit provided on a tip of the base unit 7002 and having a diameter smaller than that of the base unit 7002.

Tips of the three bosses 72 are formed as positioning surfaces extending on an identical plane perpendicular to the optical axis. Screw holes 7204 are formed in centers of the positioning surfaces 7202, respectively.

As shown in FIG. 8, the first movable body 48 has a round opening and a frame 4804 placed around the opening 4802.

Bearings 4806 are protrudingly provided in a plurality of places in the frame 4804 facing rearward. The at least two bearings are slidably connected to the guide shaft 68 (FIG. 7) placed above the opening 4604. The at least one bearing 4806 is slidably connected to the guide shaft 68 (FIG. 7) placed below the opening 4604.

Vertically extending guide shafts 74 are attachably and detachably provided in places in the frame 4804 facing forward and to the left and right of the opening 4802, respectively.

As shown in FIG. 8, the second movable body 50 has a round opening 5002 and a frame 5004 placed around the opening 5002.

The shift lens 34 is held in the opening 5002.

Two bearings 5006 are protrudingly provided with an interval between them in a vertical direction in places in the frame 5004 facing rearward and to the right of the opening 5002.

One bearing 5006 is protrudingly provided in a place in the frame 5004 facing rearward and to the left of the opening 5002.

A guide shaft 74 is slidably connected to the two bearings 5006 to the right of the opening 5002. A guide shaft 74 is slidably connected to the one bearing 5006 to the left of the opening 5002.

Accordingly, the first movable body 48 is incorporated to be transversely movable relative to the base 46 through the bearings 4806 and the guide shafts 68 and the second movable body 50 is incorporated to be vertically movable relative to the first movable body 48 through the bearings 5006 and the guide shafts 74, so that the shift lens 34 is supported to be movable relative to the base 46 in a plane perpendicular to the optical axis of the imaging optical system 14.

In other words, the first movable body 48 is supported to be movable relative to the base 46 along a first virtual axis extending on a plane perpendicular to the optical axis, and the second movable body 50 is supported by the first movable body 48 to be movable along a second virtual axis extending perpendicular to the first virtual axis on a plane perpendicular to the optical axis.

Flat coils 76 and 78 are provided in a place in the frame 5004 above the opening 5002 and corresponding to the magnet 60 and a place in the frame 5004 to the right of the opening 5002 and corresponding to the magnet 64, respectively, with axes of the flat coils 76 and 78 parallel to the optical axis.

As shown in FIGS. 7 and 8, a positioning pin 88 protruding forward, in other words, protruding toward the fixed lens holding frame 88 is provided on a boundary between a part above the opening 5002 and a part to the right of the opening 5002 in the frame 5004.

In the present embodiment, the second movable body 50 is formed by forming a synthetic resin in a die, and the opening 5002 and the positioning pin 88 are formed with high precision by an identical die part.

The shift lens 34 is inserted into the opening 5002 and attached to the frame 5004.

Accordingly, the shift lens 34 and the positioning pin 88 are provided with high precision in terms of their positions on a plane perpendicular to an optical axis of the shift lens 34.

As shown in FIGS. 7, 8 and 13, the fixed lens holding frame 52 is attached to the base 46 to cover the first movable body 48 and the second movable body 50 with the first movable body 48 and the second movable body 50 assembled with the base 46.

As shown in FIG. 8, the fixed lens holding frame 52 has a round opening 5202 and a frame 5204 placed around the opening 5202.

The fixed lens 36 is held in the opening 5202.

Yokes 82 and 84 are provided in a place in the frame 5204 above the opening 5202 and corresponding to the flat coil 76 and a place in the frame 5204 to the right of the opening 5202 and corresponding to the flat coil 78, respectively.

Two positioning holes 5206 engaged with small diameter units 7004 (FIG. 7) of the positioning pins 70 are formed on a rear surface of the frame 5204 facing rearward. One of the two positioning holes is round and the other is formed as a long hole.

Three positioning surfaces 5208 are formed which may be brought into contact with the positioning surfaces 7202 (FIG. 7) of the bosses 72 on the rear surface of the frame 5204 facing rearward. Screw insertion holes 5210 are formed on the positioning surfaces so that male screws are screwed into the screw holes 7204.

Accordingly, the fixed lens holding frame 52 and the first and second movable bodies 48 and 50 are assembled with the base 46 as shown in FIGS. 14 and 15 by bringing the positioning surfaces of the fixed lens holding frame 52 into contact with the positioning surfaces 7202 of the bosses 72 of the base 46 with the first movable body 48 and the second movable body 50 incorporated in the base 46; fitting the small diameter units 7004 of the positioning pins 70 of the base 46 in the positioning holes 5206 of the fixed lens holding frame 52; screwing screws 2 into the screw holes 7204 from the screw insertion holes 5210; and fastening the screws 2.

Here, as shown in FIG. 12, the magnet 60 and the yoke 62 of the base 46, the flat coil 76 of the second movable body 50 and the yoke 82 of the fixed lens holding frame 52 are placed on one straight line parallel to the optical axis.

That is, there is formed a magnetic path from the magnet 60 through the flat coil 76 to the yoke 82 and from the yoke 82 through the yoke 62 to the magnet 60.

A force to vertically move the second movable body 50 is generated by magnetic interaction between a magnetic field generated by supplying a driving signal from the actuator driver 126 (FIG. 3) to the flat coil 76 and a magnetic field of the magnet 60.

Accordingly, the magnet 60, the yokes 62 and 82 and the flat coil 76 form a first actuator vertically moving the second movable body 50.

As shown in FIG. 8, a positioning recess 90 into which the positioning pin 88 of the second movable body 50 is inserted is provided in a place in the frame 5204 corresponding to the positioning pin 88.

The positioning recess 90 has two pairs of walls 90A and 90B opposed to each other which allow movement of the positioning pin 88 in two directions perpendicular to each other on a plane perpendicular to the optical axis and determine a range of movement of the positioning pin 88.

In the present embodiment, the walls 90A of one pair are vertically opposed to each other, and the walls 90B of the other pair are transversely opposed to each other.

In the present embodiment, the fixed lens holding frame 52 is formed by forming a synthetic resin in a die, and the opening 5202 and the positioning recess 90 (the two pairs of walls 90A and 90B) are formed with high precision by an identical die part.

The fixed lens 36 is inserted into the opening 5202 and attached to the frame 5204.

Accordingly, the fixed lens 34 and the two pair of walls 90A and 90B of the positioning recess 90 are provided with high precision on a plane perpendicular to an optical axis of the fixed lens 36.

In the present embodiment, the positioning pin 88 and the positioning recess 90 form a movement control structure provided in a region ranging from the second movable body 50 to the fixed lens holding frame 52 to allow movement of the second movable body 50 in the aforementioned two directions and control a range of movement of the second movable body 50.

The magnet 64 and the yoke 66 of the base 46, the flat coil 78 of the second movable body 50 and the yoke 84 of the fixed lens holding frame 52 are placed on one straight line parallel to the optical axis.

That is, there is formed a magnetic path from the magnet 60 through the flat coil 78 to the yoke 84 and from the yoke 84 through the yoke 66 to the magnet 64.

A force to transversely move the second movable body 50 is generated by magnetic interaction between a magnetic field generated by supplying a driving signal from the actuator driver 126 (FIG. 3) to the flat coil 78 and a magnetic field of the magnet 64.

Accordingly, the magnet 64, the yokes 66 and 84 and the flat coil 78 form a second actuator transversely moving the second movable body 50.

In the present embodiment, the first and second actuators form an actuator 86 moving the shift lens 34 in a plane perpendicular to the optical axis of the imaging optical system 14.

As shown in FIG. 16, a driving signal is supplied from the actuator driver 126 (FIG. 3) to the flat coils 76 and 78 through the flexible printed circuit board 80.

The flexible printed circuit board 80 has a coil side connection unit 80A connected to the flat coils 76 and 78; a driver side connection unit 80C connected to the actuator driver 126; and a middle unit 80B connecting the coil side connection unit 80A to the driver side connection unit 80C.

The coil side connection unit 80A extends along a front surface of the frame 5004 of the second movable body 50 facing forward.

The middle unit 80B extends in an arc shape on a circumference ranging from a part above the second movable body 50 to a part to the right of the second movable body 50 and having the optical axis of the shift lens 34 as a center.

The driver side connection unit 80C longitudinally extends in a part to the right of the second movable body 50 and has a folded part.

As shown in FIG. 17, a notch 8002 is formed in a crosswise center of a boundary between the coil side connection unit 80A and the middle unit 80B.

A projection 5010 fitted with the notch 8002 is provided in a place in the frame 5004 of the second movable body 50 corresponding to the notch 8002. The frame 5004 has two locking pawls 5012 locking both sides of a place in the middle unit 80B close to the boundary between the coil side connection unit 80A and the middle unit 80B from outside in a crosswise direction.

The middle unit 80B is bent at approximately 90° rearward from the coil side connection unit 80A with the notch 8002 fitted in the projection 5010 and both sides of the middle unit 80B locked by the two locking pawls 5012.

The middle unit 80B bent at 90° is provided with a clearance ensured between the middle unit 80B and an inner periphery of the lens barrel 16 (an inner periphery of the rectilinear propagation guide ring 1612 (FIG. 6)) and a clearance ensured between the middle unit 80B and the first and second movable bodies 48 and 50. The middle unit 80B extends in an arc shape along a periphery of the optical axis of the shift lens 34 with a thickness direction of the middle unit 80B directed to the optical axis of the shift lens 34.

That is, the longitudinal middle unit 80B of the flexible printed circuit board 80 extends in an arc shape having the optical axis of the imaging optical system 14 as a center in a place not interfering with the first and second movable bodies 48 and 50 with a crosswise direction of the middle unit 80B directed parallel to the optical axis of the imaging optical system 14.

Accordingly, the middle unit 80B has a sufficient length ensured and therefore is easily yielded in accordance with movement of the second movable body 50 along a plane perpendicular to the optical axis. Furthermore, since the middle unit 80B is not brought into contact with the inner periphery of the lens barrel 16, it is possible to reduce a reaction force of the middle unit BOB applied to the second movable body 50 from the middle unit BOB. This is advantageous for sure and smooth movement of the shift lens 34 by the actuator 86 (FIG. 12).

As shown in FIGS. 9 and 10, the image blur correcting unit 30 is assembled with the rear barrel 32.

As shown in FIGS. 7 and 11, the image blur correcting unit 30 is assembled with the rear barrel 32 by inserting the flanges 4606 of the base 46 into the recesses 3206 and screwing the screws 4 to washers 6, conical coil springs 8, the screw insertion holes 40 of the main body plate 3204 of the rear barrel 32 and the screw holes 7204 of the base 46 from behind the main body plate 3204.

In this case, as shown in FIG. 10, the second abutting surfaces 54 of the base 46 abut the first abutting surfaces 38 of the rear barrel 32 by an energizing force generated by compressing the conical coil springs 8 (FIG. 11) between bottom walls of the recesses 44 on the rear surface 3204B of the main body plate 3204 and heads of the screws 4.

The screw insertion holes 40 of the rear barrel 32 are each formed having an inner diameter larger than a bore diameter of each of the screw holes 56 in order to ensure a clearance between the screw insertion hole 40 and an outer periphery of each of the screws 4 (FIG. 8) screwed into the screw holes 56. Therefore, the image blur correcting unit 30 is supported to be movable in a plane perpendicular to the optical axis of the imaging optical system 14.

Accordingly, in the present embodiment, a support mechanism supporting the base 46 to be movable relative to the rear barrel 32 along a plane perpendicular to the optical axis includes the first abutting surfaces 38, the second abutting surfaces 54, the conical coil springs 8, the screws 4 and the screw insertion holes 40.

The image blur correcting unit 30 is provisionally assembled with the rear barrel 32 in this manner.

The imaging optical system 14 is designed to have a best optical property when the optical axis of the shift lens 34 coincides with the optical axis of the imaging optical system 14 with the shift lens 34 placed in a neutral position that is a center within a range of movement of the shift lens 34, specifically, with the shift lens 34 placed in a central position within a range of vertical movement of the shift lens 34 and a central position within a range of transverse movement of the shift lens 34.

In the present embodiment, a neutral position that is a center within a range of movement of the shift lens 34 is a position of the shift lens 34 when the positioning pin 88 is placed in a center of the two pairs of walls 90A and 90B opposed to each other in the positioning recess 90, that is, a position of the shift lens 34 when the positioning pin 88 is placed in a center of the positioning recess 90. The imaging optical system 14 is designed to have a best optical property with the shift lens 34 placed in the neutral position.

Next, position adjustment of the image blur correcting unit 30 relative to the rear barrel 32 will be described.

This position adjustment may be performed by a method of attaching the imaging device 18 to the rear barrel 32 or a method of attaching a test chart to the rear barrel 32 instead of the imaging device 18.

First, the former method of attaching the imaging device 18 to the rear barrel 32 will be described.

In this case, a resolution evaluation test chart is placed in front of the lens barrel 16, and an image of the test chart is formed on the imaging surface of the imaging device 18 by the imaging optical system 14.

A driving signal is supplied to the actuator 86 to place the shift lens 34 in a neutral position that is a center within a range of movement of the shift lens 34.

The neutral position is a central position within a range of vertical movement of the shift lens 34 and a central position within a range of transverse movement of the shift lens 34. In the present embodiment, the neutral position is a position of the shift lens 34 when the positioning pin 88 is placed in a center in the positioning recess 90 as described above.

Such positioning of the shift lens 34 in the neutral position is performed by controlling the actuator driver 126 using the control unit 108 while detecting a position of the second movable body using the position detector 128.

Specifically, the control unit 108 controls the actuator 86 through the actuator driver 126 to vertically move the second movable body 50, and the position detector 128 detects upper and lower positions of the second movable body 50 when the positioning pin 88 of the second movable body 50 is brought into contact with each of the upper and lower walls 90A of the positioning recess 90 of the fixed lens holding frame 52.

The control unit 108 calculates a range of vertical movement from the detected upper and lower positions and determines a center of the range of movement as a central position within the range of vertical movement.

The control unit 108 controls the actuator 86 through the actuator driver 126 to transversely move the second movable body 50, and the position detector 128 detects left and right positions of the second movable body 50 when the positioning pin 88 of the second movable body 50 is brought into contact with each of the left and right walls 90B of the positioning recess 90 of the fixed lens holding frame 52.

The control unit 108 calculates a range of transverse movement from the detected left and right positions and determines a center of the range of movement as a central position within the range of transverse movement.

The control unit 108 determines a neutral position of the shift lens 34 from the vertical central position and the transverse central position obtained in this manner and moves the second movable body 50 through the actuator 86 so that the shift lens 34 is placed in the neutral position.

As shown in FIG. 10, two positioning pins of an adjusting jig (not shown) are engaged with the jig engaging recesses 58 of the base 46 through the jig insertion holes 42 from behind the rear barrel 32, respectively.

Next, the image blur correcting unit 30 is moved in a plane perpendicular to the optical axis through the adjusting pins of the adjusting jig to perform position adjustment, so that image data of the test chart imaged by the imaging device 18 has a best resolution evaluated by a known method, in other words, the imaging optical system 14 has a best optical property.

Accordingly, the optical axis of the shift lens 34 coincides with the optical axis of the imaging optical system 14 in the neutral position of the shift lens 34 by this position adjustment.

Second, the method of attaching a test chart to the rear barrel 32 instead of the imaging device 18 will be described.

In this case, a test chart having a resolution evaluation chart printed on an optically transparent film is attached to the rear surface 3204B of the rear barrel 32 so that the test chart faces the opening 3202 of the rear barrel 32.

A screen is placed in front of the lens barrel 16, and the test chart attached to the rear barrel 32 is irradiated with a predetermined light source from behind the test chart.

Accordingly, an image of the test chart is projected on the screen through the imaging optical system 14.

As in the former method, a driving signal is supplied to the actuator 86 to place the shift lens 34 in a neutral position that is a center within a range of movement of the shift lens 34.

As shown in FIG. 10, two positioning pins of an adjusting jig (not shown) are engaged with the jig engaging recesses 58 of the base 46 through the jig insertion holes 42 from behind the rear barrel 32, respectively.

Next, the image blur correcting unit 30 is moved in a plane perpendicular to the optical axis through the adjusting pins of the adjusting jig to perform position adjustment, so that the image of the test chart projected on the screen has a best resolution evaluated by a known method (for example, visually observed), in other words, the imaging optical system 14 has a best optical property.

Accordingly, the optical axis of the shift lens 34 coincides with the optical axis of the imaging optical system 14 in the neutral position of the shift lens 34 by this position adjustment.

After completion of the position adjustment of the image blur correcting unit 30 relative to the rear barrel 32 as described above, the three recesses 44 are filled with an ultraviolet curable adhesive from behind the rear barrel 32, and the filled ultraviolet curable adhesive is irradiated with ultraviolet rays to adhere and fix the heads of the screws 4 to the rear barrel 32.

Accordingly, the image blur correcting unit 30 is unmovably fixed to the rear barrel 32 and the lens barrel 16 is completely assembled.

Therefore, in the present embodiment, the ultraviolet curable adhesive forms a fixing device fixing the base 46 to the rear barrel 32.

Imaging using the imaging apparatus 10 is performed as follows.

Specifically, the imaging apparatus 10 is powered on so that imaging using the image blur correcting unit 30 may be performed.

Next, the control unit 108 performs an initialization operation of placing the shift lens 34 in the neutral position using the positioning pin 88 provided in the second movable body 50 and the two pairs of walls 90A and 90B of the positioning recess 90 provided in the fixed lens holding frame 52 in the aforementioned manner.

After completion of the initialization operation, the control units 108 performs control corresponding to a normal imaging operation and moves the shift lens 34 according to a quantity of shake generation to correct image blur.

As described above, in the present embodiment, the image blur correcting unit 30 includes the base 46 supporting the shift lens 34 to be movable in a plane perpendicular to the optical axis of the imaging optical system 14, and the lens barrel 16 includes a support mechanism supporting the base 46 to be movable relative to the rear barrel 32 along a plane perpendicular to the optical axis and a fixing device fixing the base 46 to the rear barrel 32.

Accordingly, the base 46 of the image blur correcting unit 30 may be fixed to the rear barrel 32 after adjustment of the shift lens 34.

When a refracting power of each lens group forming the imaging optical system 14 is increased in order to reduce the imaging optical system 14 in size in a direction of the optical axis and in a direction perpendicular to the optical axis, a positional deviation of a central position (central axis) of a curvature of each lens from the optical axis of the imaging optical system 14 greatly affects performance of the imaging optical system 14. Therefore, a resolution and a quantity of ambient light are easily reduced even if a slight positional deviation occurs. However, in the present embodiment, the base 46 of the image blur correcting unit 30 may be fixed to the rear barrel 32 with the optical axis of the shift lens 34 coinciding with the optical axis of the imaging optical system 14 for the above reason. Accordingly, the lens barrel 16 and the imaging apparatus 10 may be advantageously reduced in size while ensuring optical performance of the imaging optical system 14.

When a lens barrel is a collapsible lens barrel and has a shift lens of an image blur correcting unit placed in a middle place in an optical axis of an imaging optical system, the shift lens is placed within a cam ring or a rectilinear propagation guide ring, making it difficult to adjust a position of the shift lens from outside the lens barrel using an adjusting jig. However, in the present embodiment, the support mechanism is provided in the rear barrel 32 placed on the rear edge of the lens barrel 16. This is advantageous in that a position of the image blur correcting unit 30 may be easily adjusted although the lens barrel 16 is a collapsible lens barrel.

The lens barrel 16 of the present embodiment includes the imaging optical system 14; and the image blur correcting unit 30 moving the shift lens 34 forming the imaging optical system 14 in a plane perpendicular to the optical axis of the imaging optical system 14. The image blur correcting unit 30 includes the second movable body 50 holding the shift lens 34 and provided to be movable in two directions perpendicular to each other on a plane perpendicular to the optical axis. The fixed lens holding frame 52 holding the fixed lens 36 forming the imaging optical system 14 is placed in front of the second movable body 50. The movement control structure is provided in a region ranging from the second movable body 50 to the fixed lens holding frame 52 to allow movement of the second movable body 50 in the two directions and control a range of movement of the second movable body 50. Therefore, the lens barrel 16 has the following advantages.

Specifically, it is possible to determine a range of movement in two directions perpendicular to each other on a plane perpendicular to the optical axis of the shift lens 34 using the positioning pin 88 provided in the second movable body 50 and the positioning recess 90 provided in the fixed lens holding frame 52 and to place the shift lens 34 in a neutral position resulting from the range of movement.

When a refractive index of each lens forming the imaging optical system 14 is increased in order to reduce the imaging optical system 14 in size in a direction of the optical axis and in a direction perpendicular to the optical axis, a positional deviation of a central position (central axis) of a curvature of each lens from the optical axis of the imaging optical system 14 greatly affects performance of the imaging optical system 14. Therefore, a resolution and a quantity of ambient light are easily reduced even if a slight positional deviation occurs. However, in the present embodiment, the optical axis of the shift lens 34 may be allowed to accurately match with the optical axis of the fixed lens 36 in the neutral position in the shift lens 34 for the above reason. Accordingly, the lens barrel 16 and the imaging apparatus 10 may be reduced in size while ensuring optical performance of the imaging optical system 14.

Since the opening 5004 of the second movable body 50 and the positioning pin 88 are formed in an identical die, it is possible to ensure a relative positional accuracy between the positioning pin 88 and the optical axis of the shift lens 34 attached to the opening 5004. Furthermore, since the opening 5204 of the fixed lens holding frame 52 and the two pairs of walls 90A and 90B of the positioning recess 90 are formed in an identical die, it is possible to ensure a relative positional accuracy between the walls 90A and 90B and the optical axis of the fixed lens 36 attached to the opening 5204.

Accordingly, the optical axis of the shift lens 34 may be more advantageously allowed to accurately match with the optical axis of the fixed lens 36 in the neutral position in the shift lens 34, and the lens barrel 16 and the imaging apparatus 10 may be more advantageously reduced in size while ensuring optical performance of the imaging optical system 14.

In the present embodiment, the base 46 of the image blur correcting unit 30 is separated from the rear barrel 32 of the lens barrel 16; however, in an embodiment of the present invention, the base 46 of the image blur correcting unit 30 may obviously be formed integrally with the rear barrel 32 of the lens barrel 16.

In the present embodiment, the image blur correcting unit 30 is placed immediately in front of the rear barrel 32; however, the aforementioned image blur correcting unit 30 may be placed in a middle unit of the lens barrel 16.

In the present embodiment, the positioning pin 88 and the positioning recess 90 form a movement control structure provided in a region ranging from the second movable body 50 to the fixed lens holding frame 52 to allow movement of the second movable body 50 in the aforementioned two directions and control a range of movement of the second movable body 50; however, it is possible to provide the positioning pin 88 in the fixed lens holding frame 52 and provide the positioning recess 90 in the second movable body 50.

Further, the movement control structure may be formed by separately providing a structure controlling a range of movement in one of the two directions and a structure controlling a range of movement in the other of the two directions; however, the structure may be advantageously simplified according to the present embodiment.

Members forming the movement control structure are not limited to the aforementioned pin and recess and various known structures may be applied to the structure.

In the present embodiment, the lens barrel 16 is mounted on a digital still camera as the imaging apparatus 10; however, the lens barrel 16 according to an embodiment of the present invention may be mounted on various imaging apparatus such as a video camera.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel comprising:
    a rear barrel to which an imaging device is attachable;
    an imaging optical system leading a subject image to the imaging device; and
    an image blur correcting unit moving a shift lens forming the imaging optical system in a plane perpendicular to an optical axis of the imaging optical system, wherein
    the image blur correcting unit includes a base supporting the shift lens in a plane perpendicular to the optical axis of the imaging optical system, along a first virtual axis extending and a second virtual axis that extends in a direction perpendicular to the first virtual axis in a plane perpendicular to an optical axis of the imaging optical system, and
    the lens barrel includes a support mechanism supporting the base to be movable relative to the rear barrel along a plane perpendicular to the optical axis; and
    a fixing device fixing the base to the rear barrel.

2. A lens barrel according to claim 1, wherein the support mechanism includes:
    a first abutting surface provided in a place in the rear barrel facing the image blur correcting unit, and extending on a plane perpendicular to the optical axis;
    a second abutting surface provided in the base and capable of being brought into contact with the first abutting surface; and
    an energizing member energizing the base in a direction in which the second abutting surface abuts the first abutting surface.

3. A lens barrel according to claim 1, wherein the support mechanism includes:
    a first abutting surface provided in a place in the rear barrel facing the base, and extending on a plane perpendicular to the optical axis;
    a second abutting surface provided in the base and capable of being brought into contact with the first abutting surface;
    a screw member extending parallel to the optical axis, attached to one of the rear barrel and the base, and supported by the other of the rear barrel and the base to be movable on a plane perpendicular to the optical axis; and
    a coil spring wound around a shaft of the screw member, provided between a head of the screw member and the other of the rear barrel and the base, and energizing the base in a direction in which the second abutting surface abuts the first abutting surface.

4. A lens barrel according to claim 1, wherein the image blur correcting unit includes:
    a first movable body supported to be movable relative to the base along a first virtual axis extending on a plane perpendicular to the optical axis; and
    a second movable body holding the shift lens and supported to be movable relative to the first movable body along a second virtual axis extending perpendicular to the first virtual axis on a plane perpendicular to the optical axis.

5. A lens barrel according to claim 1, wherein
    the image blur correcting unit includes:
    a first movable body supported to be movable relative to the base along a first virtual axis extending on a plane perpendicular to the optical axis;
    a second movable body holding the shift lens and supported to be movable relative to the first movable body along a second virtual axis extending perpendicular to the first virtual axis on a plane perpendicular to the optical axis; and
    an actuator moving the second movable body along the first and second virtual axes.

6. A lens barrel according to claim 1, wherein the image blur correcting unit includes:
- a first movable body supported to be movable relative to the base along a first virtual axis extending on a plane perpendicular to the optical axis;
- a second movable body holding the shift lens and supported to be movable relative to the first movable body along a second virtual axis extending perpendicular to the first virtual axis on a plane perpendicular to the optical axis; and
- an actuator moving the second movable body along the first and second virtual axes,
- the actuator includes a coil attached to the second movable body and a magnet attached to the rear barrel,
- a driving signal is supplied to the coil by a flexible printed circuit board, and
- a longitudinal middle unit of the flexible printed circuit board extends in an arc shape having the optical axis of the imaging optical system as a center in a place not interfering with the first and second movable bodies with a crosswise direction of the middle unit directed parallel to the optical axis of the imaging optical system.

7. A lens barrel according to claim 1, wherein
the rear barrel has a jig insertion hole formed penetrating parallel to the optical axis, and
a jig engaging unit is provided in a place in the base facing the jig insertion hole with the base supported by the rear barrel through the support mechanism.

8. A lens barrel according to claim 1, wherein
the shift lens is placed in a place closest to the imaging device in optical members forming the imaging optical system.

9. A lens barrel according to claim 1, wherein
the imaging optical system includes one or more lenses provided in front of the shift lens to be movable relative to the rear barrel along the optical axis.

10. A lens barrel according to claim 1, wherein
the imaging optical system includes one or more lenses provided in front of the shift lens to be movable relative to the rear barrel along the optical axis, and
all or part of the one or more lenses placed in front of the shift lens are formed as a collapsible lens barrel moved between a housed position closest to the imaging device and a protruding position at which the lenses are moved forward from the housed position.

11. A lens barrel according to claim 10, wherein
the base is fixed to the rear barrel so that the imaging optical system has a best optical property with the shift lens placed in a neutral position that is a center within a range of movement of the shift lens.

12. A lens barrel according to claim 1, wherein
the imaging optical system has a best optical property with the shift lens placed in a neutral position that is a center within a range of movement of the shift lens.

13. A lens barrel according to claim 1, wherein the fixing device is an adhesive.

14. A lens barrel comprising:
a barrel;
an imaging optical system leading a subject image into the barrel; and
an image blur correcting unit moving a shift lens forming the imaging optical system in a plane perpendicular to an optical axis of the imaging optical system, wherein
the barrel includes a rear barrel and a front barrel appearing from and disappearing into the rear barrel,
the image blur correcting unit includes a base supporting the shift lens in a plane perpendicular to the optical axis of the imaging optical system, along a first virtual axis extending and a second virtual axis that extends in a direction perpendicular to the first virtual axis in a plane perpendicular to an optical axis of the imaging optical system, and
the lens barrel includes a support mechanism supporting the base to be movable relative to the rear barrel along a plane perpendicular to the optical axis; and
a fixing device fixing the base to the rear barrel.

* * * * *